United States Patent [19]
Harville et al.

[11] Patent Number: 5,814,783
[45] Date of Patent: Sep. 29, 1998

[54] METHOD AND APPARATUS FOR REAL-TIME WELD-QUALITY CONTROL AND POST-PROCESS WELD-QUALITY VERIFICATION FOR HOMOPOLAR PULSED WELDING

[75] Inventors: Michael W. Harville; William F. Weldon, both of Austin, Tex.

[73] Assignee: Board Of Regents, University Of Texas Systems, Austin, Tex.

[21] Appl. No.: 613,821

[22] Filed: Feb. 23, 1996

Related U.S. Application Data

[63] Continuation-in-part of Ser. No. 393,988, Feb. 24, 1995, abandoned.

[51] Int. Cl.$^6$ ................................................. B23K 11/26
[52] U.S. Cl. ............................ 219/110; 219/109; 219/112
[58] Field of Search ................................. 219/112, 101, 219/104, 109, 110

[56] References Cited

U.S. PATENT DOCUMENTS 4,656,328   4/1987   Weldon et al. .

OTHER PUBLICATIONS

Grant et al., "Homopolar Pulse Resistance Welding–A New Welding Process", Welding Journal, pp. 24–36, May, 1979.

Harville, M.W., "Homopolar Pulsed Weld Characterization And Real–Time Quality Assurance", Abstract of Thesis (Ph.D.), 1993.

*Primary Examiner*—Clifford C. Shaw
*Attorney, Agent, or Firm*—Arnold, White & Durkee

[57] ABSTRACT

The present invention provides a method and apparatus to control and verify weld-quality in a homopolar pulsed weld by measuring in-process parameters. Methods are disclosed for real-time weld-quality control in a weld-quality control system for homopolar pulsed welding, including measuring at least one in-process parameters that correlates to a resulting weld-quality of a weld. Further, methods are disclosed for post-process weld-quality verification for homopolar pulsed welding, including identifying at least one in-process parameter that may be used as a post-process weld-quality verification parameter and utilizing such a post-process weld-quality verification parameter to verify the weld-quality after a homopolar pulsed welding process.

13 Claims, 25 Drawing Sheets

METHOD AND APPARATUS FOR REAL-TIME WELD-QUALITY CONTROL AND POST-PROCESS WELD-QUALITY VERIFICATION FOR HOMOPOLAR PULSED WELDING

The present application is a continuation-in-part of U.S. patent application Ser. No. 08/393,988, filed Feb. 24, 1995 now abandoned. The entire text of the above-referenced disclosure is specifically incorporated by reference herein without disclaimer.

BACKGROUND OF THE INVENTION

1. Field of the Invention

The present invention relates generally to the fields of welding and welding apparatus. More particularly, it concerns methods of in process control and assessment of weld quality in homopolar pulse welding operations.

2. Description of the Related Art

Homopolar pulse welding (HPW) utilizes the high current, low voltage pulse produced by a homopolar generator (HPG) to rapidly resistance heat the interface between two components to forging temperature. A force is then applied to the components to produce a forge weld at the interface, requiring only a few seconds from initiation of the pulse to completion of the weld. Because of its speed, HPW is an attractive candidate for pipeline construction in which lengths of pipe are joined together end-to-end. It has especially great potential for application in deep water offshore pipeline construction techniques, including the J-lay technique. It is essential in welded pipeline that suitable mechanical properties must be reliably and repeatedly achievable in the weld zone. Although certain in-process parameters have been used in the past to control and verify weld-quality in electrical resistance welding processes such as spot welding, they have not heretofore been successfully attempted in homopolar pulsed welding.

SUMMARY OF THE INVENTION

The present invention demonstrates that weld quality may be monitored and controlled, and that such quality may be verified by post-weld quality verification. The present invention in a broad aspect provides a method and apparatus by which weld-quality in a homopolar pulsed weld may be controlled and verified by means of in-process parameters. More specifically, the present invention enables an automatic controller in a homopolar pulsed welding process to examine a small set of measured parameters, to make adjustments to help insure weld-quality based upon those measured parameters, and then to verify, if required, the quality of the resulting weld.

To determine in-process parameters that relate to the resulting weld-quality of a homopolar pulsed weld, the homopolar generator-based welding system is first characterized so that its performance may be predicted with simple mathematical models. This characterization allows for a methodology to be created to quickly identify welding parameters that correlate to weld-quality for existing materials and geometries, as well as for new materials and geometries. After this characterization of the system, various parameters may be measured and evaluated during controlled welding tests to quantify dependable weld-quality indicators. These in-process weld-quality indicators may form the basis of a real-time quality assurance system for homopolar welding systems. Further, these parameters may be used to verify weld-quality after the process has been completed.

The present inventors have found that homopolar welding systems are amenable to in-process monitoring of weld-quality and post-process verification of weld-quality. The present invention allows the characterization of the homopolar welding system, identification of parameters that indicate weld-quality, and the separation of these parameters into two distinct groups: (1) a real-time weld-quality control group, and (2) a weld-quality verification group.

The purpose of the real-time weld-quality control group is to use parameters measured during the weld process for feedback control to assure that a high quality weld is produced. One measurable parameter that has been identified in the invention for this control group is the back-off displacement. The back-off displacement is the thermal expansion experienced by the work-pieces during the initial heating of the interfaces due to the electrical current pulse. It is also a measure of the energy to the weld interface. The weld interface is the interface between the two work-pieces being welded together using the homopolar welding system.

An important part of the back-off displacement is a servo-valve controlled hydraulic system that allows the thermal expansion to take place by maintaining a constant or controlled load on the work-pieces. By a controlled load, it is meant that the axial force that maintains contact between the two pipe ends is actively measured by a load cell and is made to follow a predetermined curve in time by means of the hydraulic servo-valve, feedback control loop. This hydraulic system provides an axial load at the weld interface between the work-pieces being welded. It has been verified by various studies that there exists a direct correlation between the magnitude of the back-off displacement and the tensile strength of a weld produced by homopolar pulsed welding. The value of the back-off displacement that produces a strong weld may be determined empirically in controlled tests of sample work-pieces prior to actual work-piece welding. Then, while monitoring the back-off displacement during the weld process, feeding it back to a control system, and controlling the energy to the work-pieces and the weld interface, the resulting quality of the weld may be controlled in real-time.

The energy to the work-pieces and the weld interface may be controlled in a variety of ways, including controlling the current to the work-pieces during the weld process and/or by controlling the resistance of the work-pieces during the weld process. For example, the current to the work-pieces may be controlled by adjusting the voltage of the homopolar generator, and the resistance of the work-pieces may be controlled by adjusting the axial load on the work-pieces at the weld interface (e.g., increasing the axial load decreases the resistance at the weld interface). As a further example, one potential application is to use the field current to the homopolar generator as an input control parameter and the back-off displacement as a feedback control parameter, such that the quality of the weld can be controlled and assured in real-time. Alternatively, or in addition, the axial load on the work-pieces may be used as an input control parameter.

Apart from the real-time weld-quality control group, the purpose of the weld-quality verification group is to use parameters measured during the weld process to verify that a high quality weld has been achieved. Two measurable parameters that have been identified for this group are the bulk energy into the work-piece, and the forging displacement of the work-piece. The bulk energy is the electrical energy deposited into the work-pieces and is determined by measuring both the electrical current through and the voltage drop across the work-pieces, then integrating the (current) ×(voltage) power. A threshold correlation has been empirically found between the bulk energy and the tensile strength of a weld produced by homopolar pulsed welding. This indicates that if the bulk energy into the work-pieces reaches a predetermined threshold value (and proper forging displacement occurs), a strong weld is assured. The forging displacement is also a threshold correlation parameter, and represents the displacement of the work-pieces due to the forging load applied during the homopolar pulsed welding process. As with the back-off displacement, the values that correlate to a strong weld for both the bulk energy and the forging displacement may be determined by controlled studies prior to actual work-piece welding.

It has been determined that the slope of the displacement curve during forging is indicative of weld quality. In general, it is desirable for the rate of travel to be high during forging. A high rate of travel, or a step slope in the displacement curve is indicative of sufficient heating or energy deposition in the weld zone. Insufficient heating in the weld zone will produce both a reduced rate of travel and final forging distance. It may be said that the rate of displacement (or slope of the displacement curve) is sufficient when the weld zone material is soft enough from heating that it does not appreciably effect movement of the pipes during forging displacement.

Thus, three measurable parameters have been identified as particularly good weld-quality indicators: (1) the electrical energy deposited in the bulk material of the work-pieces around the interface; (2) thermal expansion of the work-piece due to the rapid temperature rise at the interface (i.e., the back-off displacement); and (3) the displacement due to forging of the work-pieces. The bulk energy deposition and the forging displacement were found to be well-suited for post-process nondestructive evaluation of weld-quality. The back-off displacement was found to be well-suited for real-time quality control of the weld-quality because it may be fully evaluated prior to upset.

In certain embodiments, the back-off displacement for different weld tests may be compared. The back-off displacement is determined by measuring the displacement with respect to zero of the lowest point for each test-line prior to the time of forging. The forging displacement for each of these tests is determined by measuring the displacement with respect to zero for each test-line during and after the time of forging.

The present invention, therefore, provides a method for in-process control of the weld-quality and a method for post-process verification of the weld-quality to be utilized in a weld-quality control system for homopolar pulsed welding. The present invention contemplates that the parameters for different work-piece materials and geometries may be empirically determined for each separate work-piece material and geometry. Although generalized preferred parameter magnitudes may not be applicable, the lack of general magnitudes is typical for other weld processes incorporating feedback control.

In a general aspect, the system includes a homopolar generator, a hydraulic forging press to hold the work-pieces to be welded, electrical connections to provide current through the weld interface, and a control system for utilizing in-process measured parameters to control the weld-quality during the homopolar welding process. The system may also include a verification system for utilizing in-process measured parameter values to verify the weld-quality after the homopolar welding process.

In another general aspect, the present invention provides a method for real-time weld-quality control in a weld-quality control system for homopolar pulsed welding, including characterizing a homopolar welding system and conducting controlled weld tests to determine at least one in-process parameter that correlates to a resulting weld-quality of a weld. The tests identify at least one in-process parameter that may be used as a real-time weld-quality control parameter. Each such real-time weld-quality control may be used as an in-process measured parameter to control weld-quality during a homopolar pulsed welding process. It will be recognized that it may be preferred to employ a combination of in-process parameters to assure weld quality.

In a more detailed aspect, the present invention provides a system for real-time weld-quality control for homopolar pulsed welding which includes determining a desired level of back-off displacement that correlates to a desired weld-quality followed by measuring a back-off displacement during a homopolar pulsed welding process. The measured back-off displacement is fed to a control system to control the energy to work-pieces being welded so that the back-off displacement is substantially equal to, or corresponds to, the desired level of back-off displacement. It is understood that the desired level of back-off displacement may be a range of levels, if appropriate.

In a still further aspect, the present invention provides a system for post-process weld-quality verification for homopolar pulsed welding. This includes characterizing a homopolar welding system and conducting controlled weld tests to determine at least one in-process parameter that correlates to a resulting weld-quality of a weld. Each such in-process parameter may then be used as a post-process weld-quality verification parameter. At least one such post-process weld quality verification parameter is also typically utilized as an in-process measured parameter to verify the weld-quality produced by the welding process.

In a more detailed aspect, the present invention provides a method for post-process weld-quality verification for homopolar pulsed welding wherein a desired level of bulk energy deposition and a desired forging displacement are determined to correlate to a desired weld-quality. The bulk energy deposition, and a forging displacement are measured during the weld. The weld-quality may then be verified by simply comparing the measured bulk energy deposition and the measured forging displacement to the desired level of bulk energy deposition and the desired forging displacement.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

The present invention addresses parameters to be used to characterize a homopolar weld process as well as basis for non-destructively examining the quality of a homopolar weld. The characterization tests comprise a three step approach to developing baseline process parameters. This three step approach comprises tests on continuous pipe, tests with the pipe-to-pipe interfaces under constant load, and testing of upset welds.

In a general sense, the invention first characterizes a homopolar weld process, resulting in data that may be used to non-destructively evaluate the quality of a weld and further used as a real-time quality assurance method. Since weld dynamics occur primarily at the weld interface, certain parameters are directed to isolating these dynamics. In the course of the invention, parameters of interest are separated in two ways: (a) by eliminating the interface completely and performing tests with a single continuous pipe, and (b) by using two pipes and an interface just like a typical weld, but delivering the upset load and maintaining a constant load throughout the duration of the current pulse. The results of these two tests are then compared to a series of weld tests in which only one input parameter was varied in each test (see Table 1). In this manner, the dynamic response of the interface may be isolated and examined, revealing quantitative indications whether a quality weld had been achieved.

TABLE 1

| Input Parameters | Output Parameters |
|---|---|
| HPG | Electrical |
| Initial energy stored (rotor speed) | Current vs. time |
| Magnetic field vs. time | Current uniformity |
| Weld Specimen | Voltage vs. time |
| Material | Resistance vs. time |
| Interface geometry | Power vs. time |
| Surface preparation | Energy deposition |
| Electrode distance | Thermal |
| Forging Process | Temperature vs. time |
| Initial load | Temperature uniformity |
| Upset load | Mechanical |
| Upset time | Load vs. time |
| Deformation | Displacement vs. time |
|  | Destructive test properties (toughness, tensile strength, etc.) |
|  | Microstructural characteristics (morphology, uniformity, etc.) |

Figure 1:
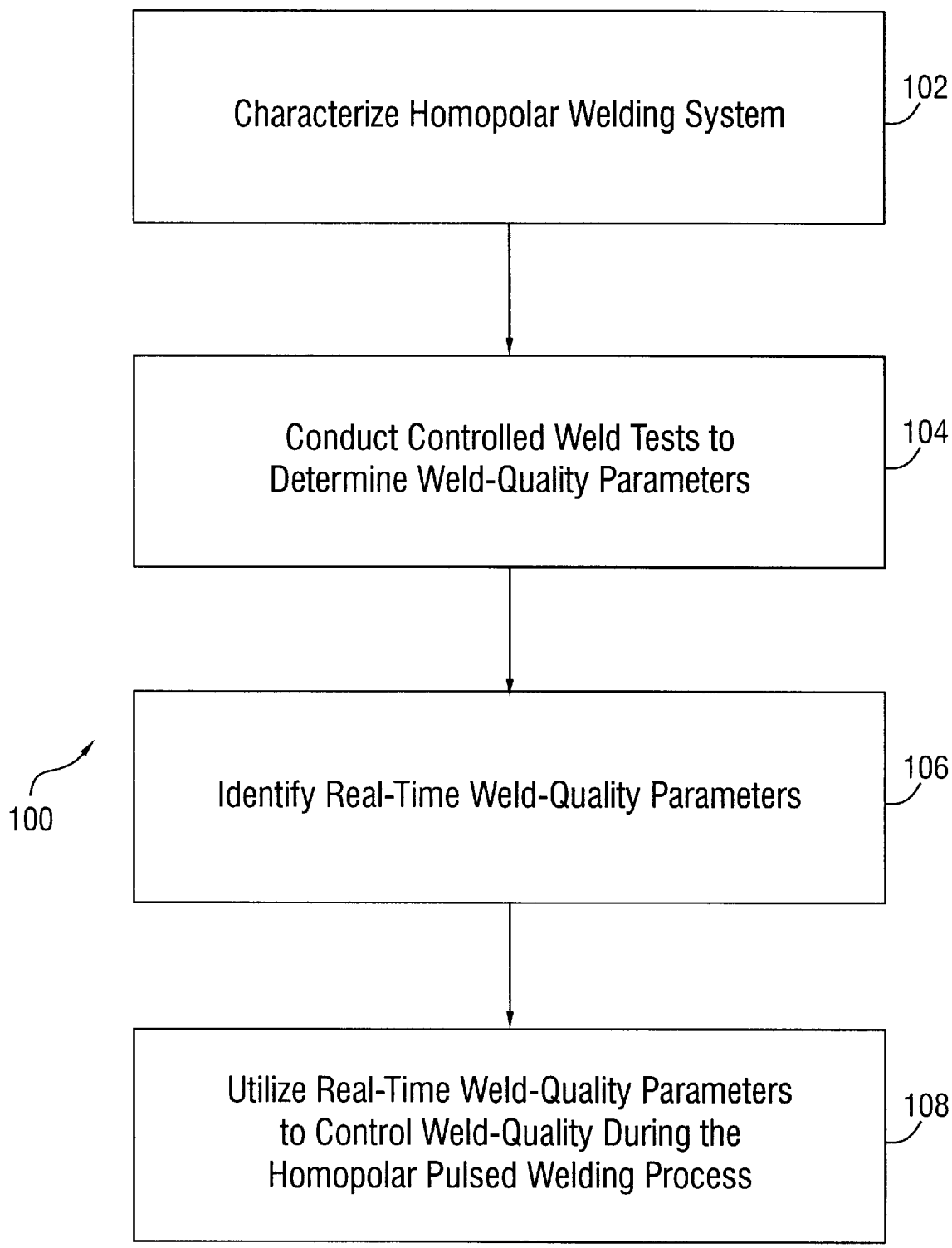
FIG. 1—Flow diagram of a process 100, including process steps 102, 104, 106 and 108, that embodies the present invention.
Figure 2:
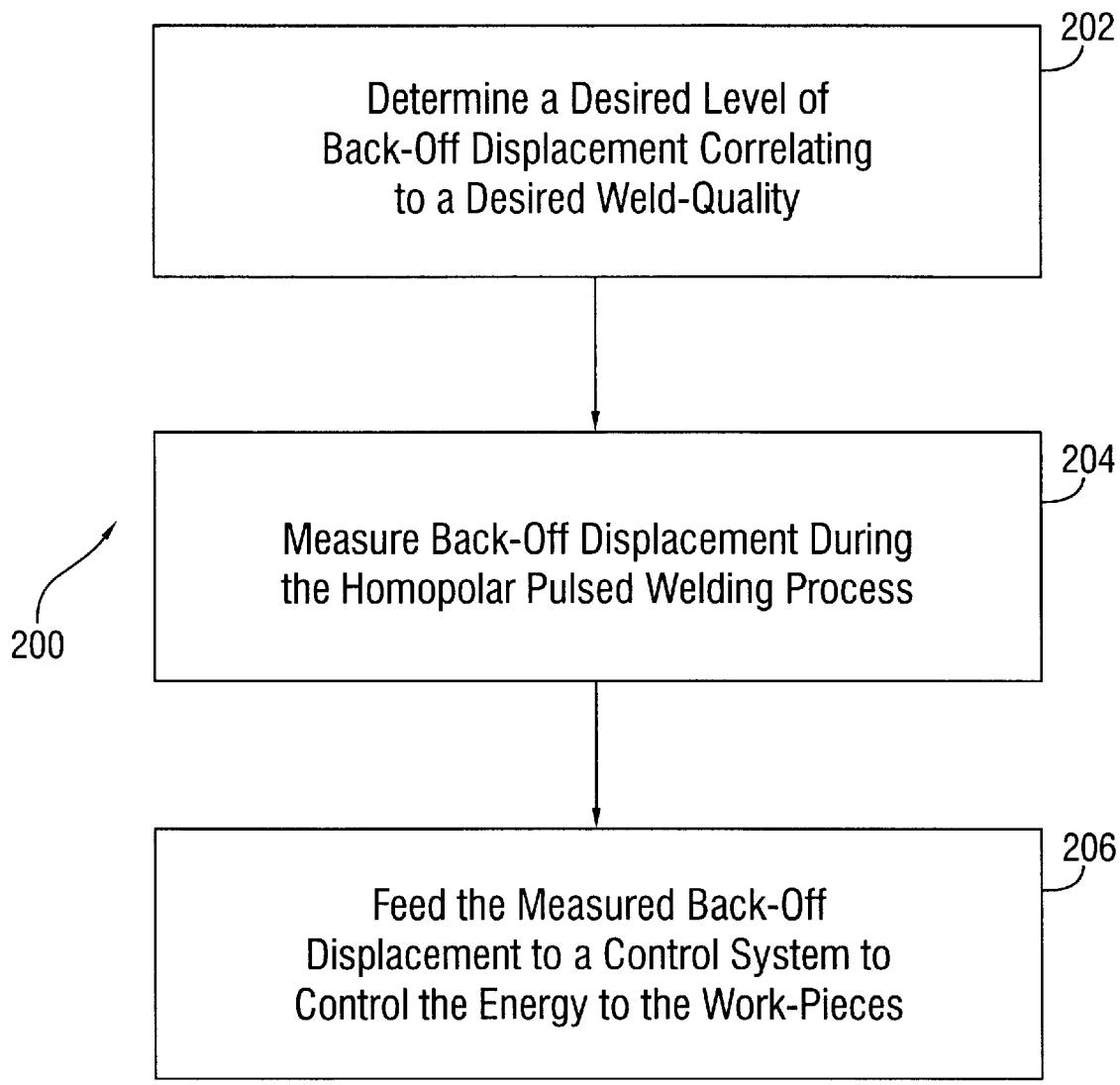
FIG. 2—Flow diagram of a process 200, including process steps 202, 204 and 206, that represents another embodiment of the invention.

Turning to FIG. 1, a flow diagram of process 100 includes process steps characterizing a homopolar welding system 102, conducting controlled weld tests to determine weld quality parameters 104, identifying real time weld quality parameters 106, and utilizing these real-time weld quality parameters to control weld quality during a homopolar pulsed welding process 108.

FIG, 2 depicts a flow diagram of process 200, including process steps of determining a desired level of back-off displacement correlating to a desired weld quality 202, measuring the back-off displacement during the homopolar pulsed welding process 204, and feeding the measured back-off displacement to a control system to control the energy to the work pieces 206.

Figure 3:
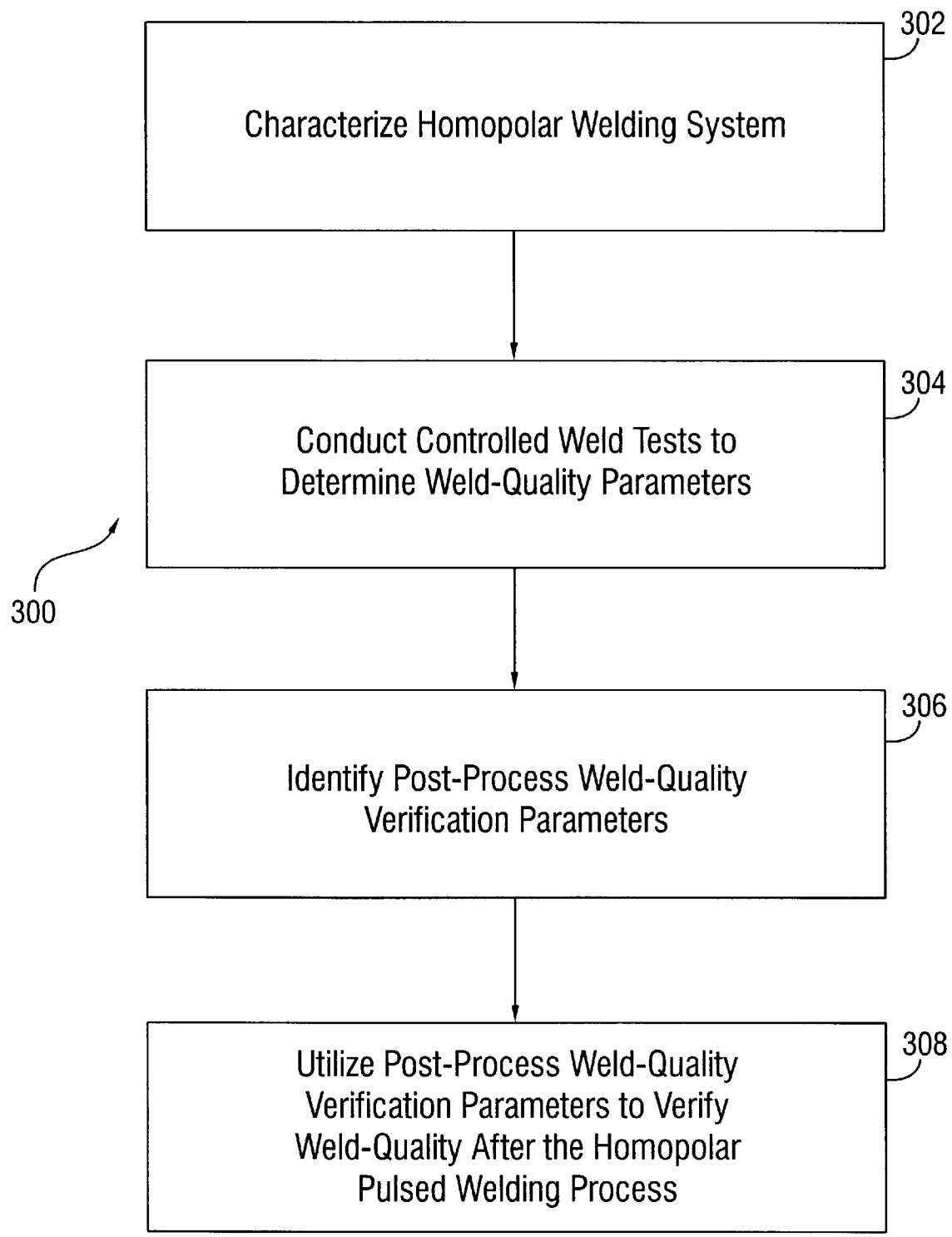
FIG. 3—Flow diagram of a process 300, including process steps 302, 304, 306 and 308, that represents another embodiment of the invention.

FIG. 3 is a flow diagram of process 300, including process steps of characterizing a homopolar welding system 302, conducting controlled weld tests to determine weld quality parameters 304, identifying post-process weld quality verification parameters 306, and utilizing the post-process weld quality verification parameters to verify weld-quality after the homopolar welding process 308.

Figure 4:
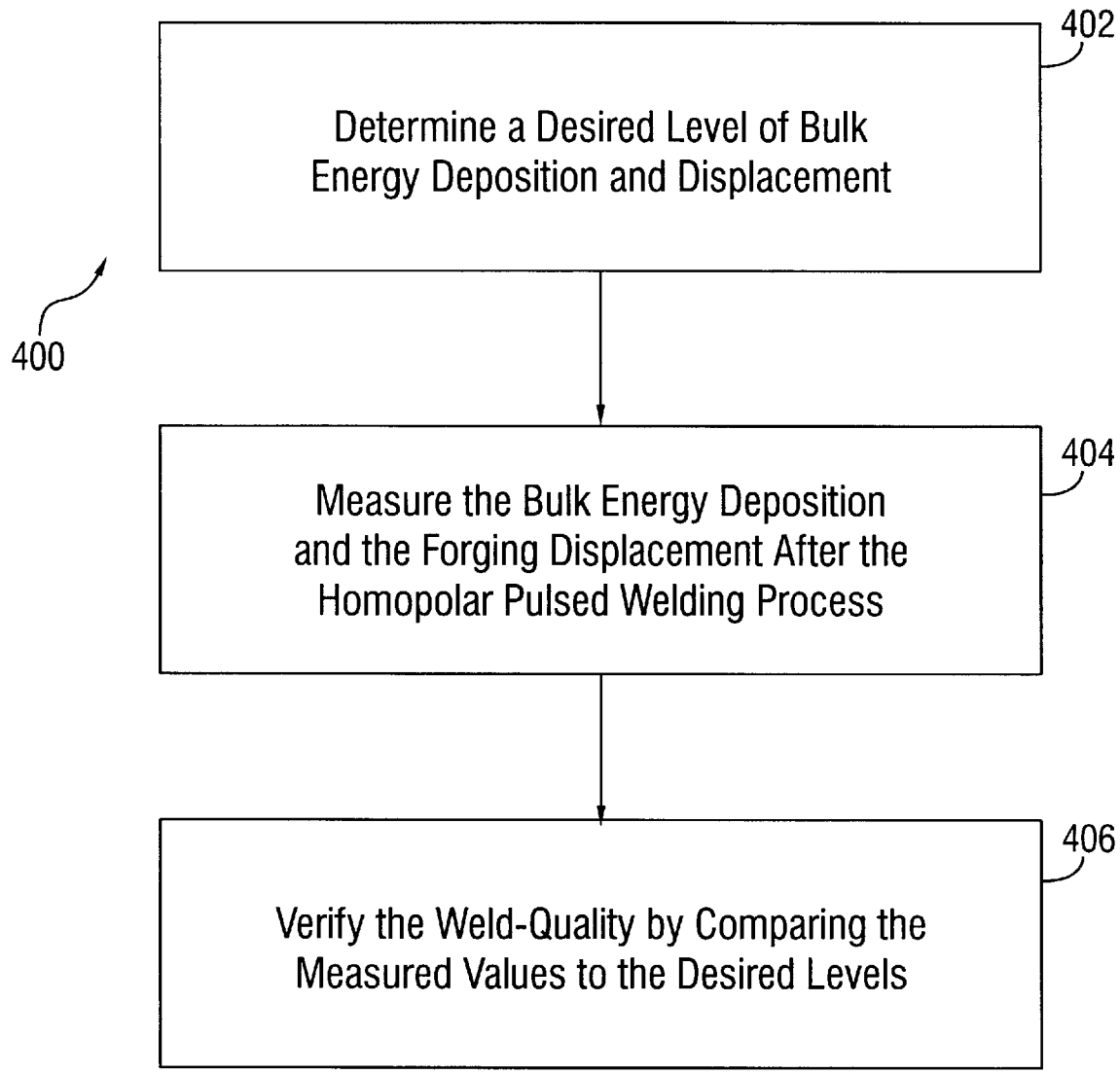
FIG. 4—Flow diagram of a process 400, including process steps 402, 404 and 406, that represents a further embodiment of the invention.

FIG. 4 is a flow diagram of process 400, including process steps of determining a desired level of bulk energy deposition and displacement 402, measuring the bulk energy deposition and the forging displacement after the homopolar pulsed welding process 404, and verifying the weld quality by comparing the measured values to the desired levels 406.

Figure 5:
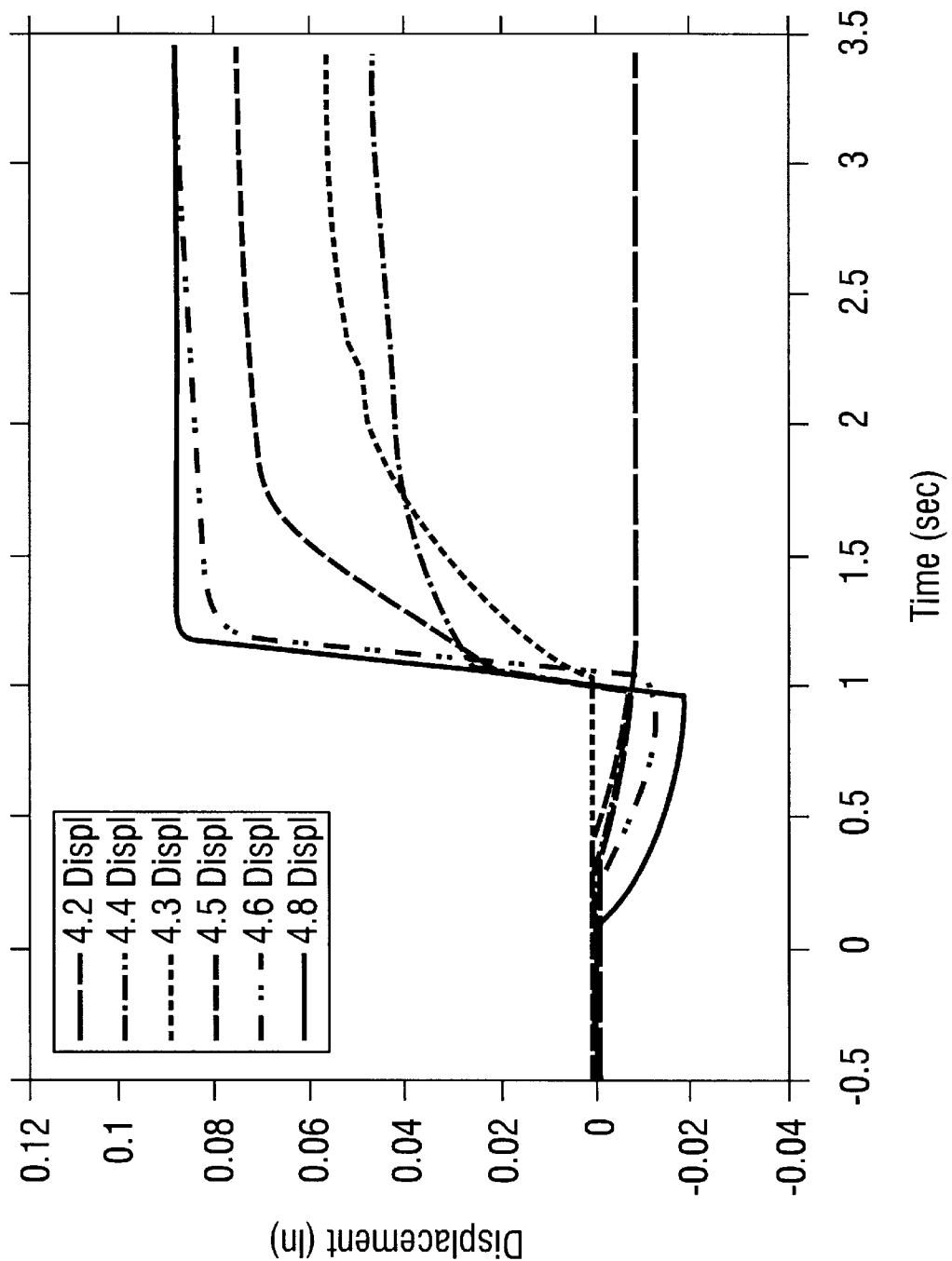
FIG. 5—Diagram comparing displacement characteristics for six different weld tests—test numbers 4.2, 4.3, 4.4, 4.5, 4.6 and 4.8.

FIG. 5 shows displacement versus time curves that trace a typical forge welding sequences in six different weld tests—test numbers 4.2, 4.3, 4.4, 4.5, 4.6 and 4.8, in which pipes were placed end-to-end prior to welding. The back-off displacements shown were determined by measuring displacement with respect to zero of the lowest point for each test-line prior to the time of forging. The forging displacement for each of these tests is determined by measuring the displacement, with respect to zero, of the highest point for each test-line after the time of forging. Some variation in welds is seen, probably due to variations in heating, and therefore softening of the metal. It should also be noted that test 4.2 represents a homopolar pulsed weld done without forging.

Figure 6A:
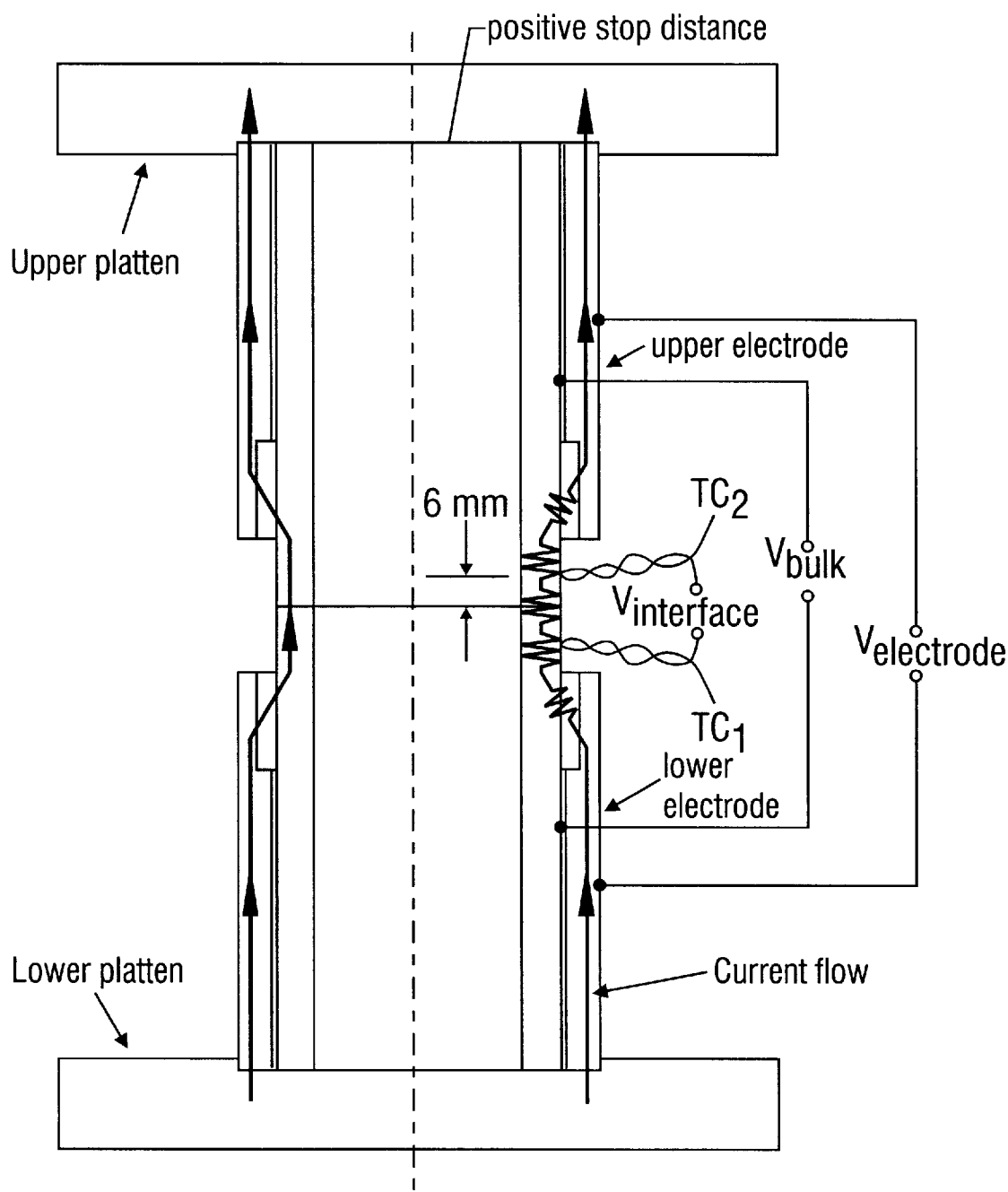
FIG. 6(A), 6(B)—Workpiece setup with physical location of the voltage probes used to measure the assumed workpiece voltages.

Before discussing the examples, attention is directed to FIG. 6A, which is a schematic diagram of the apparatus employed in the examples. The apparatus shows the physical location of the voltage probes used to measure the assumed work-piece resistances. Also shown is the setup of measuring the interface resistance by one leg each of two thermocouples located on either side of the interface.

In conducting a test, current is delivered to the interface of the pipes by the copper electrode pads clamped to the outside surface of both pipes. Current flows axially through the electrode fingers into the pipe, across the interface, and through the other pipe and electrode to complete the circuit. A positive stop limits the displacement of the pipes during application of the upset load. When the upset load is applied, the pipes are typically hot enough to deform plastically at the weld interface. The positive stop acts to limit deformation and minimize the upset region that protrudes out from the inside diameter and outside diameter of the pipe.

Figure 6B:
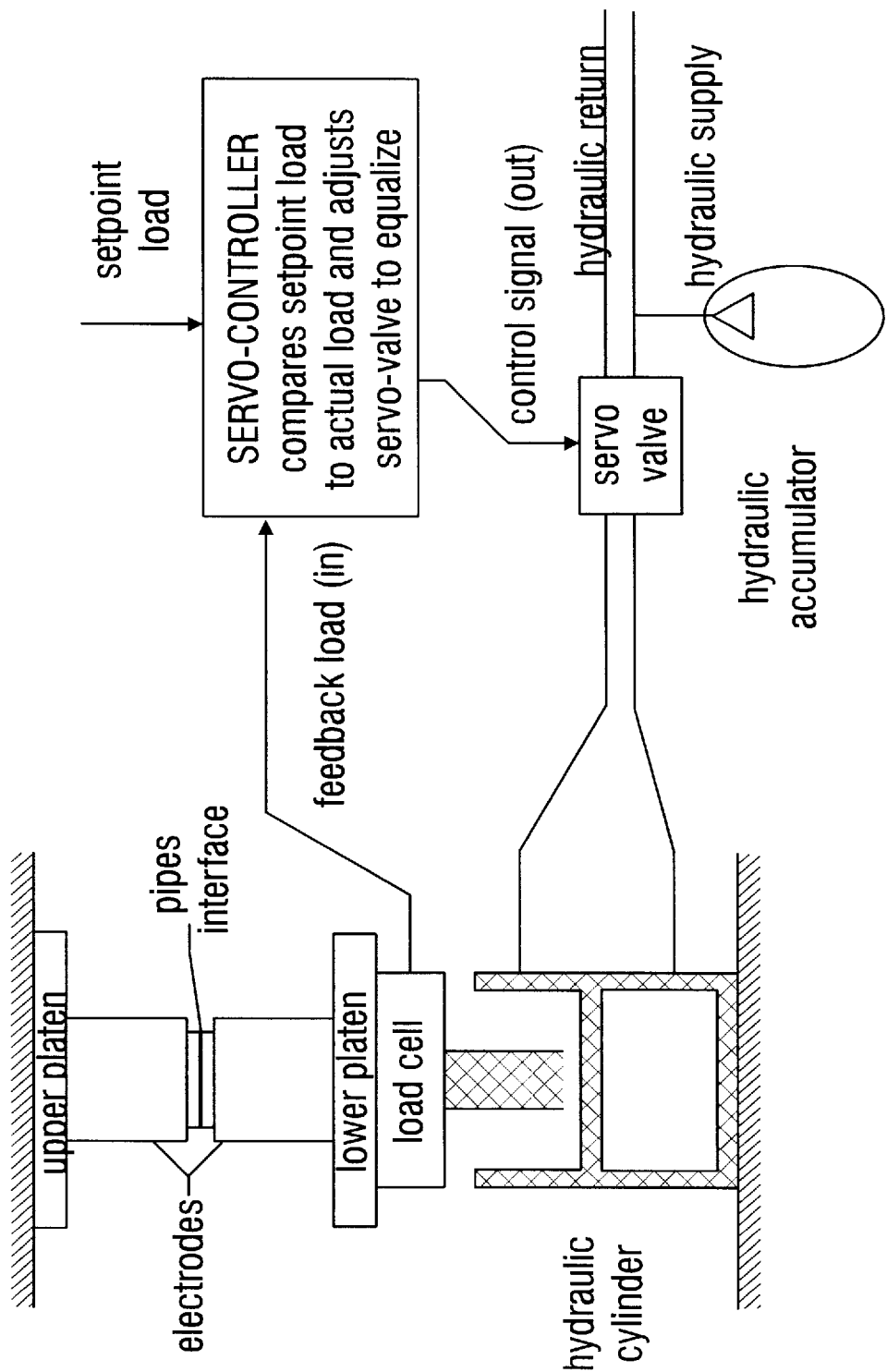

Controlling the load under which the two pipes are butted together is a hydraulic cylinder and servo-valve feedback loop (FIG. 6B). Using the output of a load cell to measure the axial force on the pipes, a controller maintains the initial load by making constant adjustments with the servo-valve and delivers the predetermined upset load at the upset time.

The following examples are included to demonstrate preferred embodiments of the invention. The techniques disclosed in the examples were discovered to function well in the practice of the invention, and thus can be considered to constitute preferred embodiments. Those of skill in the art will, in light of the present disclosure, appreciate that many changes can be made in the specific embodiments which are disclosed and still obtain a like or similar result without departing from the spirit and scope of the invention.

Continuous Pipe Test Example

This test eliminated the welding interface from the discharge circuit by installing a single continuous pipe between the pipe welding electrodes. The purpose of the test was to provide a baseline set of process curves to be compared to subsequent tests when the interface is put back into the circuit. In addition, this test was used to derive the values for the lumped electrical elements used as a baseline for developing a state-variable model of the entire system.

The value for the discharge speed (initial energy stored) was chosen to approximate the range in which the subsequent constant load and upset weld tests were to be performed. This discharge speed for the continuous pipe test may be less than the final value used in the upset weld tests. With an initial energy stored value of 1406.6 kilojoules at 2000 rpm, a magnetic field v. time of 0.66 constant Tesla, an electrode distance of 0.5 in, an initial load of 13.5 kip, the output parameters for the continuous pipe test are presented in FIG. 7 through FIG. 10, using Sch. 160, X52 medium carbon steel pipe.

Figure 7:
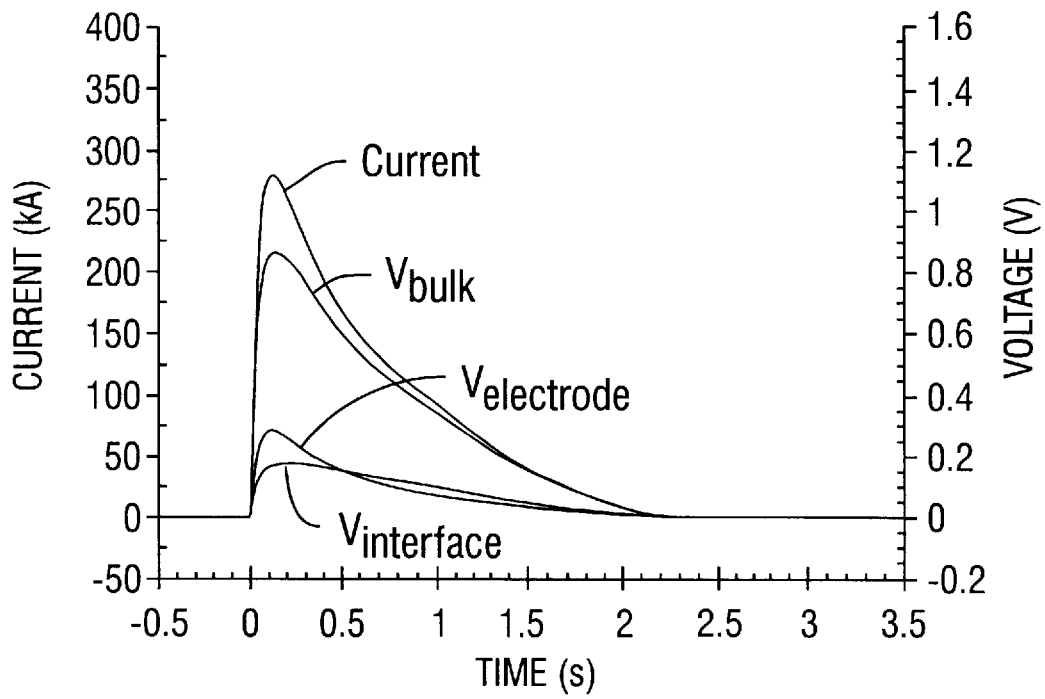
FIG. 7—Plot of current and workpiece voltages for continuous pipe test SP6.5.

FIG. 7 shows the current pulse measured in the discharge circuit and the derived workpiece voltages. The locations of the voltage measurement probes are the same as presented in FIG. 6. The interface voltage curve is the voltage measured by interface voltage probes, and serves as a baseline for subsequent tests where the interface is present.

Figure 8:
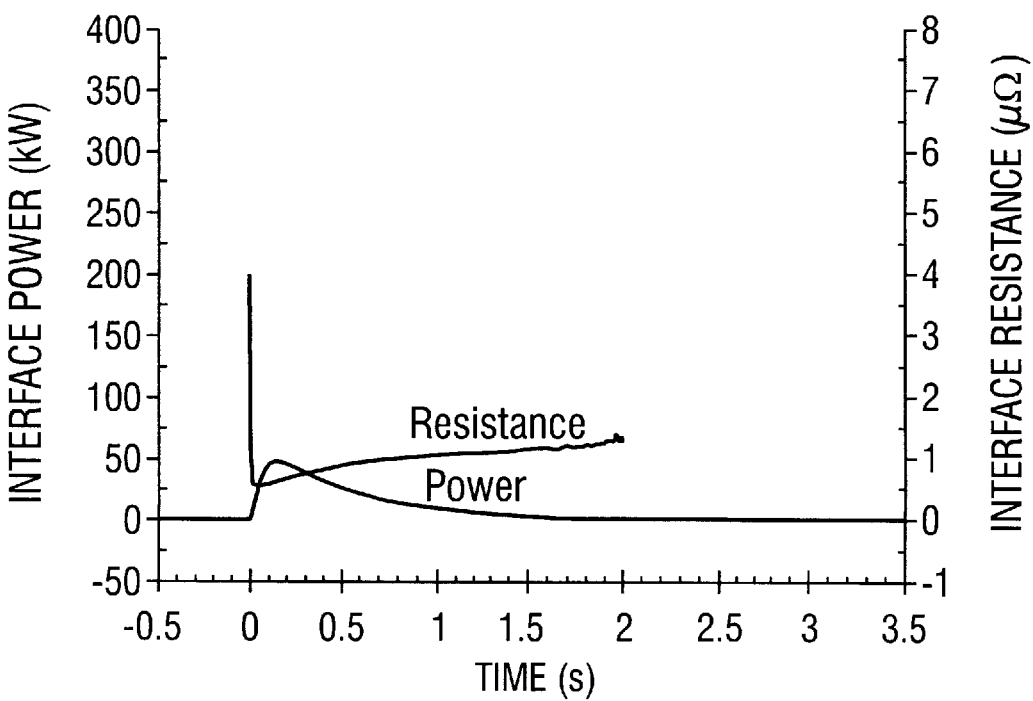
FIG. 8—Plot of interface power and resistance curves for continuous pipe SP6.5.

FIG. 8 shows the "interface" power and resistance curves, derived using the interface voltage and total circuit current. The resistance curve shows a slight increase as the bulk temperature rises then reaches an asymptotic value as the energy input from resistive heating is balanced by the energy lost via conductive heat transfer.

As a check on the value of the derived resistance curve, an approximate resistance can be calculated from the known geometry and material property data. The resistance between the interface voltage probes may be calculated by the following equation:

$$R = \frac{Pe^1}{A} = \frac{(0.167E-6)(0.012)}{2.716E-3} = 0.74 \mu\Omega \qquad \text{Equation 1}$$

where:
R=resistance derived from interface voltage probes ($\Omega$)
Pe=electrical resistivity of steel at room temperature= 0.167E-6 $\Omega$-m
l=distance between $V_{interface}$ probes=12 mm=0.012 m
A=cross-sectional area of pipe=4.21 in$^2$=2716 mm$^2$ Comparing the value for the resistance in equation 1 and the asymptotic value in FIG. 8, it can be seen that the increased resistivity due to the higher pipe temperature makes a measurable difference. However, the room temperature assumption for the resistivity proves a good approximation.

Figure 9:
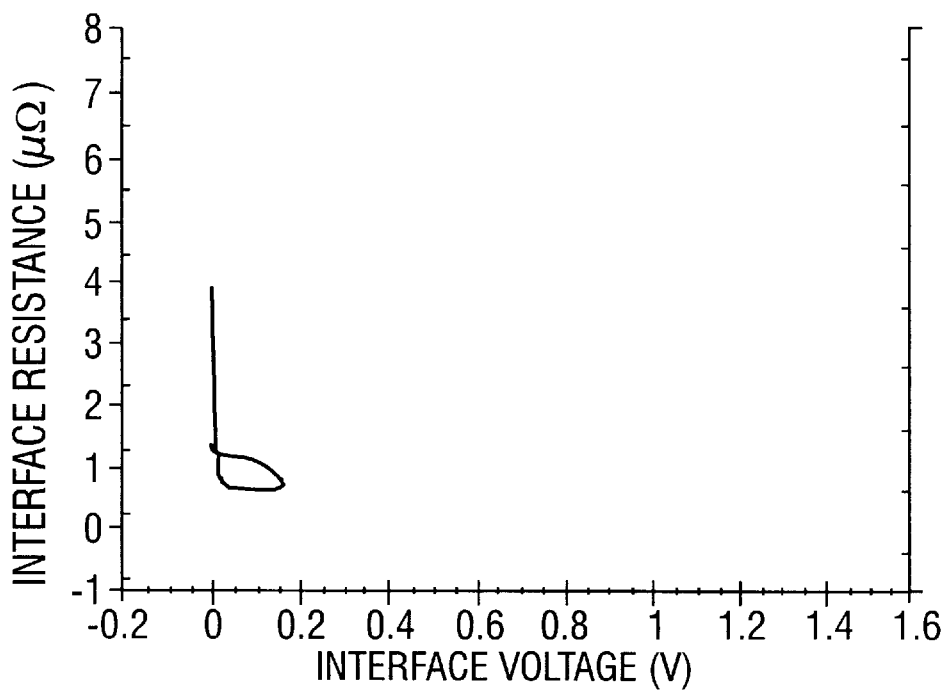
FIG. 9—Plot of interface resistance vs. voltage curve for the continuous pipe test SP6.5.

The measured interface voltage was plotted against the derived interface resistance in FIG. 9. This curve shows that the pulsed nature of the homopolar heating makes comparison to a calculated steady state resistance vs. voltage curve difficult.

Figure 10:
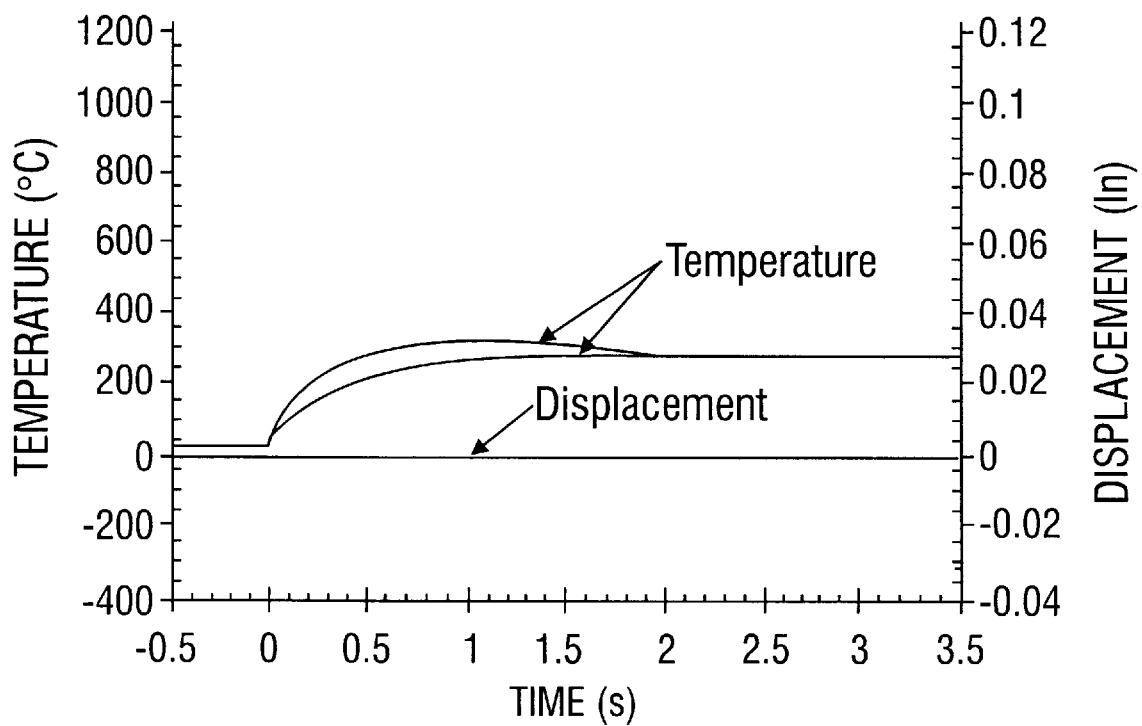
FIG. 10—Plot of temperature and displacement curves for the continuous pipe test SP6.5.

FIG. 10 shows the temperature curves as measured by two thermocouples located 12 mm apart, as shown in FIG. 6. Typical of the thermocouple data presented in this test, the difference in rise times of the two thermocouples was not necessarily an indication of a difference in the material temperature. Rather, the difference may be due to the difficult nature of establishing a repeatable thermocouple attachment to the workpiece.

Also shown in FIG. 10 is the displacement of the workpiece during the current pulse. If the workpiece had become sufficiently hot, a noticeable negative displacement would be shown on the plot due to the thermal expansion of the bulk material of the pipe. Since the hydraulic system maintains a constant load, it allows backward movement of the platens when the workpiece thermally expands. The thermal expansion is defined as the back-off displacement ($D_{bo}$) and can be considered an indication of the total energy deposited into the workpiece since it is directly proportional to the temperature of the bulk material. The approximate back-off displacement may be calculated from the temperature and coefficient of thermal expansion.

$$\Delta l = \alpha l \Delta T = (12.0E\text{-}6)(1)(268) = 0.0032 \text{ in.} \quad \text{Equation 2}$$

where:

$\Delta l$=change in distance due to thermal expansion (in.)

$\alpha$=steel room temperature coefficient of thermal expansion=12.0/° C.

l=room temperature length=2(0.5 in.)=1.0 in.

$\Delta T$=approximate change in pipe temperature=268° C.

A synopsis of standard data is presented in Table 2. As can be seen from the lumped element energies, only 11% of the energy initially stored in the generator is actually deposited in the workpiece. This percentage deposition increases to approximately 17% when an interface was introduced into the circuit (as seen later in Table 8). As used herein, "lumped" means the mathematical convenience of combining all of the distributed resistances and inductances in the electro-mechanical circuit into discrete elements.

TABLE 2

The standard data synopsis for the continuous pipe test (SP6.5).

| Description | Units | Data |
|---|---|---|
| Experiment No. | | SP6.5 |
| Experiment Date | | 3/25/92 |
| Experiment Type | | continuous |
| Rotor speed (setpoint/actual) | rpm | 2200/2000 |
| Initial rotor energy | kJ | 1404.6 |
| Current Pk/time | kA/sec | 278/0.112 |
| Pulse Length | sec | 2.2 |
| Voltages | | |
| Hpg Peak/time | V/sec | 5.0/0.015 |
| Circuit Peak/time | V/sec | 3.3/0.022 |
| Electrode Peak/time | V/sec | 0.28/0.105 |
| Bulk Peak/time | V/sec | 0.86/0.130 |
| Interface Peak/time | V/sec | 0.18/0.200 |
| Resistances at Peak Current | | |
| Hpg | $\mu\Omega$ | 16.2 |
| Circuit | $\mu\Omega$ | 8.7 |
| Electrode | $\mu\Omega$ | 1.0 |
| Bulk | $\mu\Omega$ | 3.1 |
| Interface | $\mu\Omega$ | 0.6 |
| Powers | | |
| Hpg Peak/time | kW/sec | — |
| Circuit Peak/time | kW/sec | — |
| Electrode Peak/time | kW/sec | — |
| Bulk Peak/time | kW/sec | 240/0.120 |
| Interface Peak/time | kW/sec | 48/0.138 |
| Interface Energy Deposition | | |
| Time at 25% of final | sec | 0.193 |
| Time at 50% of final | sec | 0.372 |
| Time at 75% of final | sec | 0.660 |
| Energies | | |
| Brush final/% of final | kJ/% | 244/17 |
| HPG final/% of final | kJ/% | 643/46 |
| Circuit final/% of final | kJ/% | 304/22 |
| Electrode final/% of final | kJ/% | 34/2 |
| Bulk final/% of final | kJ/% | 121/9 |
| Interface final/% of final | kJ/% | 28/2 |
| Energy Budget | kJ/% | 31/2 |
| Displacement back/final | mils/in | 1/0.0 |

TABLE 2-continued

The standard data synopsis for the continuous pipe test (SP6.5).

| Description | Units | Data |
|---|---|---|
| Tensile Strength | | |
| with upset lips | ksi | na |
| without upset lips | ksi | 89/90 |
| Failure wrt weld line | | na |

Comments
nt = not tested
Notes
na = not applicable

Lumped Element Evaluation—Continuous Pipe Test

The continuous pipe test also serves as a means of characterizing the values of the various lumped elements in the circuit. This was done by comparing peak voltage values predicted by an approximate lumped element, RLC closed-form calculation to the peak voltage values measured for each "lumped element" in the discharge circuit. By iteratively refining the individual resistances and inductances in the closed-form calculation, approximate values for the impedances were developed. The limitation of this type of analysis is that the lumped element values used in the closed-form solution were assumed to be constant. Since it has been shown that the workpiece resistance varies significantly during the current pulse and the homopolar generator inductance can vary as current diffuses into the rotor (Pillsbury, 1976), the lumped element values determined in this analysis can only be considered to be approximate. However, the lumped element model did prove to be an easy method of examining the discharge circuit.

Using the peak and time-to-peak values shown in Table 2 as a guideline, RLC circuit values were developed for a closed-form solution that yielded the same results as those measured. First, a total resistance and inductance was determined that would produce the same peak current (278 kA) and time-to-peak (112 ms) as was measured in test SP 6.5 (continuous pipe). The total resistance and inductance were then separated and associated with the various lumped elements in the circuit. The predicted calculated from the complete equals then calculated from the complete equation for element voltage, including both the resistive and inductive terms (Equation 3). By empirically varying each individual resistance and inductance and then comparing the resulting voltage output to the corresponding measured peak value, an approximate impedance value for each lumped element was determined. Table 3 shows the separation of the derived total values for resistance and inductance into the individual lumped values. The values of the resistances calculated using the measured voltage to measured current ratio (at peak current) in Equation 3 are also shown in Table 3 as a comparison to the RLC derived values. Table 4 compares the measured voltage curves to those calculated using the individual element values in Table 3.

TABLE 3

| Lumped Element | Measured Resistance ($\mu\Omega$) | Derived Resistance ($\mu\Omega$) | Derived Inductance ($\mu H$) |
|---|---|---|---|
| Hpg | 16.2 | 16.3 | 0.240 |
| Circuit | 8.7 | 11.2 | 0.315 |
| Electrode | 1.0 | 1.0 | 0.006 |
| Bulk | 3.1 | 3.1 | −0.080 |

TABLE 3-continued

| Lumped Element | Measured Resistance ($\mu\Omega$) | Derived Resistance ($\mu\Omega$) | Derived Inductance ($\mu H$) |
|---|---|---|---|
| Interface | 0.6 | 0.4 | −0.330 |
| Additional | — | −4.8 | 0.649 |
| Total | 29.6 | 27.2 | 0.864 |

TABLE 4

| Lumped Elements | Measured Voltages | | Calculated Voltages | |
|---|---|---|---|---|
| | peak (V) | time of peak (ms) | peak (V) | time of peak (V) |
| Hpg | 4.55 | 91 | 4.55 | 91 |
| Circuit | 3.3 | 22 | 3.3 | 22 |
| Electrode | 0.28 | 105 | 0.28 | 105 |
| Bulk | 0.86 | 130 | 0.86 | 131 |
| Interface | 0.18 | 200 | 0.18 | 198 |

$$V_e = V_r + V_i = R_e I + L_e \frac{dI}{dt} \quad \text{Equation 3}$$

where:

$V_e$=total lumped element voltage drop (V)
$V_r$=resistive voltage drop at a lumped element (V)
$V_i$=inductive voltage drop at a lumped element (V)
$R_e$=lumped element resistance ($\mu\Omega$)
I=circuit current (A)
$L_e$=lumped element inductance (H)

Constant Load Test Example The constant load test was the next step in isolating and examining the interface dynamics. Using two pipes inserted in the pipe welding electrodes exactly like a typical weld test, the initial load on the pipes was maintained constant throughout the duration of the current pulse. In this manner, the interface voltage and resistance could be examined without the upset required to produce a strong weld. The input parameters for the constant load test are shown in Table 5.

TABLE 5

The input parameters for the constant load test (test NSF 4.2).

| Input Parameters | Value | Units |
|---|---|---|
| HPG | | |
| Initial energy stored (rpm) | 1980.6 (2375) | kilojoules (rpm) |
| Magnetic field vs. time | 0.66 constant | Tesla |
| Weld Specimen | | |
| Material | Sch. 160 X52 medium carbon steel Area = 2.716E-3 m² = 4.21 in² | na |
| Interface geometry | flat | na |
| Surface preparation | 63 lathe turned | rms |
| Electrode distance | 0.5 (12.7) | in (mm) |
| Forging Process | | |
| Initial load | 13.5 (60) | kip (kN) |
| Upset load | none | kip (kN) |
| Upset time | none | sec |
| Deformation (positive stop) | none | in (mm) | na = not applicable

The value for the discharge speed was increased over the continuous pipe test since the heating in that test was observed to be less than that expected to produce a strong weld. These results indicate the processes for quantifying the proper weld parameters. Like the continuous pipe test, an additional constant load test was performed at the final upset weld parameters after they had been determined.

Figure 11:
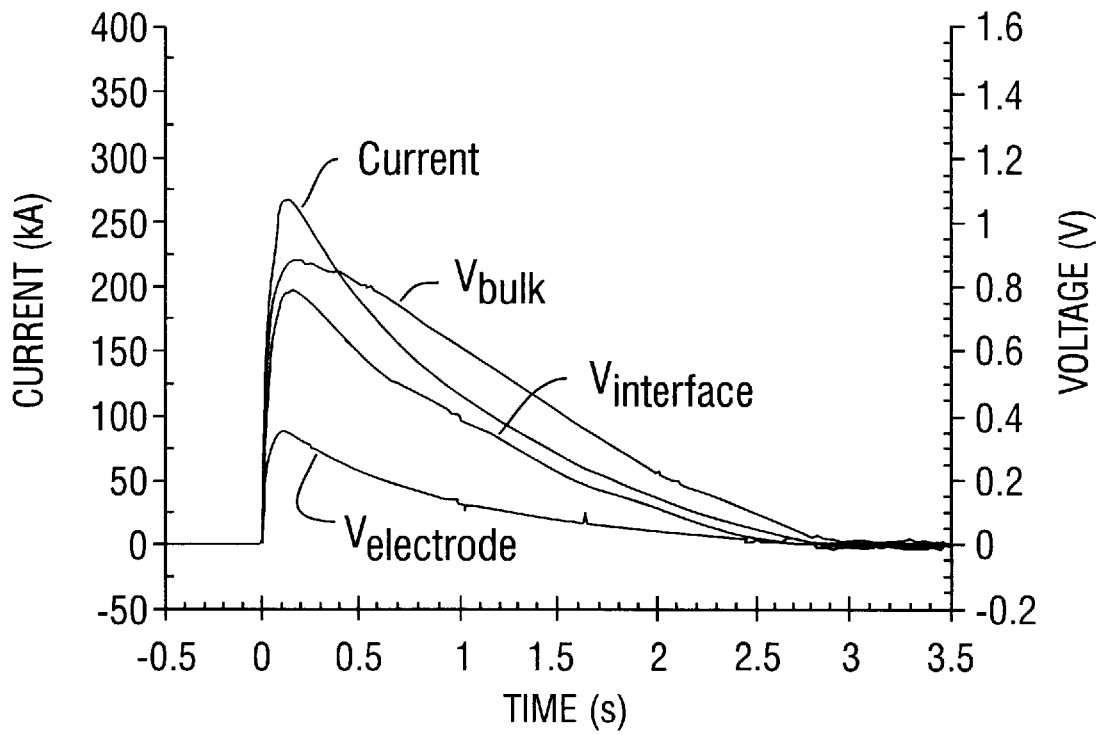
FIG. 11—A plot of the test current and work-piece voltages for the constant load test (NSF 4.2).

Compared to the continuous pipe (FIG. 7), an increase in the interface voltage is shown in FIG. 11 due to the addition of the interface in the constant load test. The existence of the interface also produces a noticeable effect in the bulk voltage. After it reaches its peak value, the bulk voltage decreases more slowly than the interface and electrode voltages because of an increase in resistance due to the increasing bulk temperature of the pipe. Since there is essentially no bulk heating in the interface or electrode voltage measurements, these two curves follow the current pulse closely. The slight knee in the interface and bulk voltage curves at approximately 0.7 is usually an indication of some non-uniformity in the current distribution and subsequent heating pattern in the workpiece.

Figure 12:
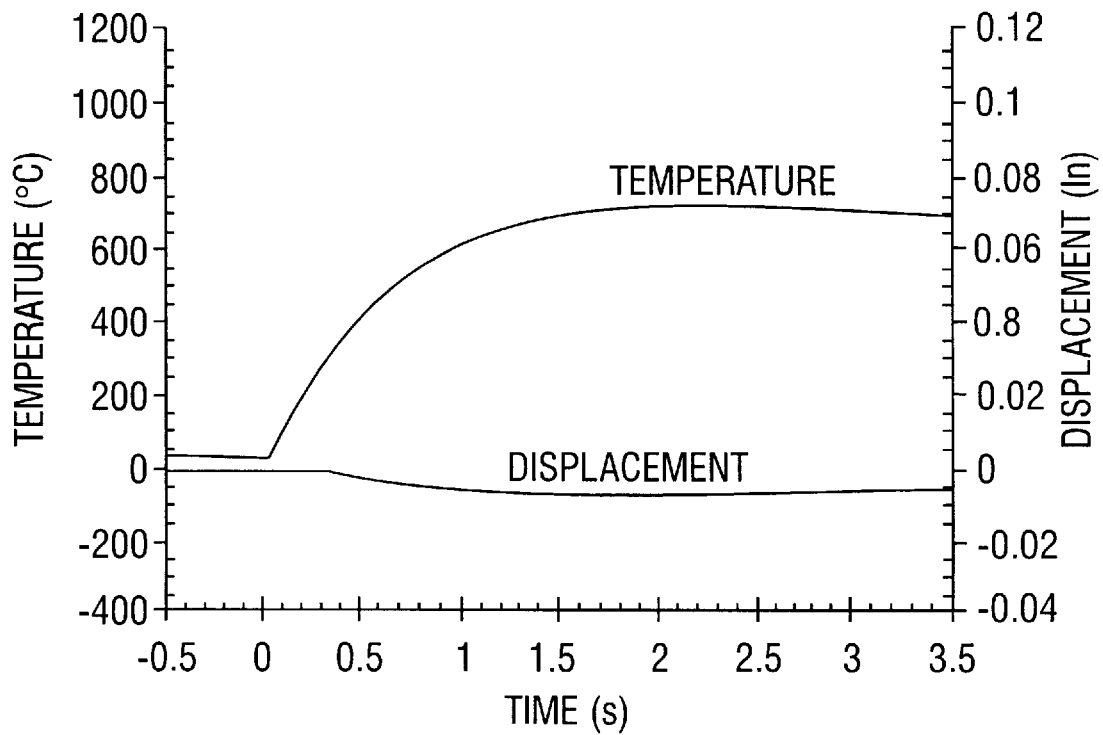
FIG. 12—Temperature and displacement curves for the constant load test.

The data synopsis for the continuous pipe and constant load test are shown in Table 6. Even with a higher discharge speed in the constant load test (NSF 4.2), the peak current is seen to be lower than that produced in the continuous pipe test. This is because the interface introduces enough increase in the total circuit resistance to reduce the resultant current. This increase can be seen by comparing the interface resistances at peak current. The internal HPG resistance, which is the inherent (or internal) resistance of the homopolar generator, is also seen to show an increase that would further reduce the current output. This variation in HPG resistance was seen throughout the testing and is thought to be variability in the contact force of the brushes in the generator. The existence of the interface between the pipes can also be seen by comparing the energy deposited in both the bulk and the interface. While the bulk energy deposited for both tests remains at 9% of the initial energy stored, the interface energy increases from 2% in the continuous pipe to 7% in the constant load test. As shown in FIG. 12, the back-off displacement is also greater due to the heating of the interface.

TABLE 6

The standard data synopsis comparing the continuous pipe (SP6.5) and constant load (NSF 4.2) tests.

| Description | Units | Data | Data |
|---|---|---|---|
| Experiment No. | | SP6.5 | NSF4.2 |
| Experiment Date | | 3/25/92 | 3/17/92 |
| Experiment Type | | continuous | const. load |
| Rotor speed (setpoint/actual) | rpm | 2200/2000 | 2500/2375 |
| Initial rotor energy | kJ | 1404.6 | 1980.6 |
| Current Pk/time | kA/sec | 278/0.112 | 267/0.122 |
| Pulse Length | sec | 2.2 | 2.8 |
| Voltages | | | |
| HPG Peak/time | V/sec | 5.0/0.015 | 5.3/0.015 |
| Circuit Peak/time | V/sec | 3.3/0.022 | 3.3/0.020 |
| Electrode Peak/time | V/sec | 0.28/0.105 | 0.35/0.110 |
| Bulk Peak/time | V/sec | 0.86/0.130 | 0.88/0.160 |
| Interface Peak/time | V/sec | 0.18/0.200 | 0.79/0.160 |
| Resistances at Peak Current | | | |
| HPG | $\mu\Omega$ | 16.2 | 19.9 |
| Circuit | $\mu\Omega$ | 8.7 | 8.7 |
| Electrode | $\mu\Omega$ | 1.0 | 1.3 |
| Bulk | $\mu\Omega$ | 3.1 | 3.3 |
| Interface | $\mu\Omega$ | 0.6 | 2.9 |

TABLE 6-continued

The standard data synopsis comparing the continuous pipe (SP6.5) and constant load (NSF 4.2) tests.

| Description | Units | Data | Data |
|---|---|---|---|
| Powers | | | |
| HPG Peak/time | kW/sec | — | — |
| Circuit Peak/time | kW/sec | — | — |
| Electrode Peak/time | kW/sec | — | — |
| Bulk Peak/time | kW/sec | 240/0.120 | 233/0.130 |
| Interface Peak/time | kW/sec | 48/0.138 | 209/0.130 |
| Interface Energy Deposition | | | |
| Time at 25% of final | sec | 0.193 | 0.205 |
| Time at 50% of final | sec | 0.372 | 0.410 |
| Time at 75% of final | sec | 0.660 | 0.755 |
| Energies | | | |
| Brush final/% of final | kJ/% | 244/17 | 366/19 |
| HPG final/% of final | kJ/% | 643/46 | 912/46 |
| Circuit final/% of final | kJ/% | 304/22 | 374/19 |
| Electrode final/% of final | kJ/% | 34/2 | 52/3 |
| Bulk final/% of final | kJ/% | 121/9 | 181/9 |
| Interface final/% of final | kJ/% | 28/2 | 134/7 |
| Energy Budget | kJ/% | 31/2 | (−)38/(−)2 |
| Displacement back/final | mils/in | 1/0.0 | 9/0.0 |
| Tensile Strength | | | |
| with upset lips | ksi | na | nt |
| without upset lips | ksi | 89/90 | nt |
| Failure wrt weld line | | na | nt |

Comments
nt = not tested
Notes
na = not applicable

Upset Weld Tests Example

The purpose of this series of testing was to hold all process control parameters constant while increasing the energy deposited at the interface by increasing the discharge speed of the generator. This produced a series of welds that began with insufficient heating at the interface (discharge speed, or stored energy, too low) and ended with slightly more than enough heating (discharge speed, or stored energy, higher than necessary). The determination of whether sufficient heating occurred was based on the tensile strength of the weld joint, and whether the joint failed at or outside of the weld line. Although tensile strength alone is not a clear indication of a quality weld, the intent was to use a standard, quantitative method of comparing the weld tests. Table 7 shows the input parameters for the upset weld series of tests.

TABLE 7

The input parameters for the upset weld tests (NSF 4.3–4.8).

| Input Parameters | Value | Units |
|---|---|---|
| HPG | | |
| Initial energy stored (rpm) | increasing | kilojoules (rpm) |
| Magnetic field vs. time | 0.66 constant | Tesla |
| Weld Specimen | | |
| Material | Sch. 160 X52 medium carbon steel Area = 2.716E-3 m$^2$ = 4.21 in$^2$ | na |
| Interface geometry | flat | na |
| Surface preparation | 63 lathe turned | rms |
| Electrode distance | 0.5 (12.7) | in (mm) |
| Forging Process | | |
| Initial load | 13.5 (60) | kip (kN) |
| Upset load | 84.2 (375) | kip (kN) |
| Upset time | 1.0 | sec |
| Deformation (positive stop) | 0.063 (1.6) | in (mm) | na = not applicable

The upset load was chosen based on the assumption that the weld zone should reach approximately 1100° C. Standard forging practice (Metal Handbook, 9th Ed., Vol. 14) lists the optimum forging pressure at 1100° C. to be 20 ksi (this corresponds to 84.2 kip with a 4.21 in$^2$ weld area). The upset time was intended to occur near the peak temperature of the weld zone, determined from the temperature measurements and video of the previous constant load test. In order to begin examining the trends in the data during this series of tests, the data synopsis is presented first (Table 8).

TABLE 8

The standard data synopsis comparing the five upset weld tests (NSF 4.3 through 4.8).

| Description | Units | Data | Data | Data | Data | Data |
|---|---|---|---|---|---|---|
| Experiment No. | | NSF4.4 | NSF4.3 | NSF4.5 | NSF4.6 | NSF4.8 |
| Experiment Date | | 4/1/92 | 3/18/92 | 4/2/92 | 4/2/92 | 5/1/92 |
| Experiment Type | | upset weld | upset weld | upset weld | upset weld | upset weld |
| Rotor speed (setpoint/actual) | rpm | 2400/2371 | 2500/2500 | 2600/2565 | 2700/2620 | 2800/2820 |
| Initial rotor energy | kJ | 1974.1 | 2194.6 | 2310.2 | 2410.4 | 2792.4 |
| Current Pk/time | kA/sec | 269/0.125 | 282/0.124 | 288/0.125 | 302/0.120 | 360/0.110 |
| Pulse Length | sec | 2.9 | 3.1 | 3.0 | 3.5 | 2.7 |
| Voltages | | | | | | |
| Hpg Peak/time | V/sec | 5.1/0.015 | 5.4/0.015 | 5.5/0.015 | 6.0/0.015 | 7.4/0.015 |
| Circuit Peak/time | V/sec | 3.2/0.022 | 3.3/0.021 | 3.4/0.020 | 3.7/0.020 | 4.5/0.015 |
| Electrode Peak/time | V/sec | 0.32/0.100 | 0.29/0.115 | 0.41/0.110 | 0.34/0.090 | 0.43/0.090 |
| Bulk Peak/time | V/sec | 0.70/0.180 | 0.85/0.180 | 0.83/0.165 | 0.95/0.425 | 1.17/0.200 |
| Interface Peak/time | V/sec | 0.83/0.100 | 0.82/0.150 | 0.80/0.110 | 0.81/0.200 | 1.01/0.130 |
| Resistances at Peak Current | | | | | | |
| Hpg | μΩ | 20.2 | 20.4 | 20.7 | 19.2 | 15.3 |
| Circuit | μΩ | 8.7 | 8.6 | 8.4 | 9.0 | 9.0 |

TABLE 8-continued

The standard data synopsis comparing the five upset weld tests (NSF 4.3 through 4.8).

| Description | Units | Data | Data | Data | Data | Data |
|---|---|---|---|---|---|---|
| Electrode | $\mu\Omega$ | 1.2 | 1.0 | 1.4 | 1.1 | 1.2 |
| Bulk | $\mu\Omega$ | 2.5 | 3.0 | 2.9 | 3.0 | 3.1 |
| Interface | $\mu\Omega$ | 3.1 | 2.9 | 2.8 | 2.6 | 2.8 |
| Powers | | | | | | |
| Hpg Peak/time | kW/sec | 1472/0.110 | 1988/0.18 | 1728/0.108 | 1965/0.130 | 2015/0.095 |
| Circuit Peak/time | kW/sec | 647/0.090 | 715/0.086 | 724/0.088 | 846/0.085 | 1220/0.075 |
| Electrode Peak/time | kW/sec | 86/0.115 | 83/0.117 | 118/0.115 | 101/0.105 | 156/0.100 |
| Bulk Peak/time | kW/sec | 186/0.140 | 237/0.143 | 236/0.140 | 278/0.150 | 410/0.145 |
| Interface Peak/time | kW/sec | 223/0.115 | 231/0.133 | 232/0.125 | 242/0.130 | 361/0.120 |
| Interface Energy Deposition | | | | | | |
| Time at 25% of final | sec | 0.218 | 0.233 | 0.226 | 0.223 | 0.184 |
| Time at 50% of final | sec | 0.437 | 0.463 | 0.457 | 0.444 | 0.365 |
| Time at 75% of final | sec | 0.772 | 0.812 | 0.801 | 0.769 | 0.673 |
| Energies | | | | | | |
| Brush final/% of final | kJ/% | 365/19 | 410/19 | 429/19 | 445/18 | 399/14 |
| HPG final/% of final | kJ/% | 945/48 | 1079/49 | 1192/52 | 1193/49 | 1139/41 |
| Circuit final/% of final | kJ/% | 383/19 | 430/20 | 454/20 | 527/22 | 553/20 |
| Electrode final/% of final | kJ/% | 46/2 | 49/2 | 64/3 | 55/2 | 63/2 |
| Bulk final/% of final | kJ/% | 141/7 | 194/9 | 198/9 | 264/11 | 267/10 |
| Interface final/% of final | kJ/% | 155/8 | 172/8 | 172/7 | 177/7 | 204/7 |
| Energy Budget | kJ/% | (−)61/(−)3 | (−)138/(−)6 | (−)199/(−)9 | (−)251/(−)10 | 168/6 |
| Displacement back/final | mils/in | 7/0.028 | 0.0/0.069 | 7/0.084 | 13/0.107 | 19/0.113 |
| Tensile Strength | | | | | | |
| with upset lips | ksi | 8.8/9.4 | 63/62 | 74/68 | 88/87 | not |
| without upset lips | ksi | nt | nt | nt | 90/90 | 89/90 |
| Failure wrt weld line | | at weld | at weld | at weld | outside | outside |

Comments
nt = not tested
Notes
na = not applicable

Figure 13:
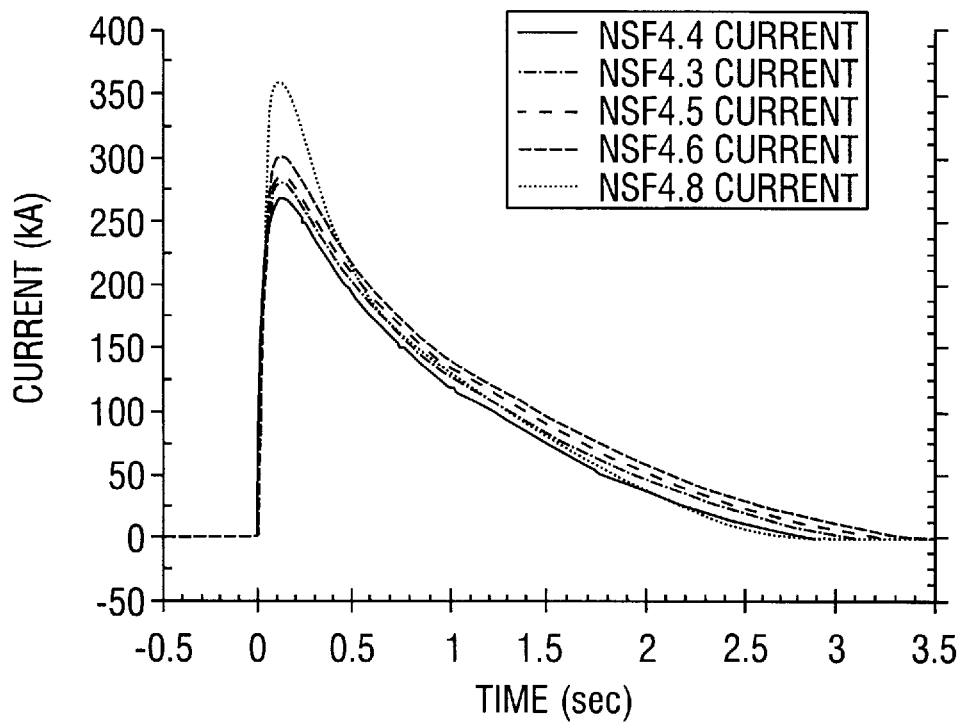
FIG. 13—A comparison of the various currents for the upset weld tests (NSF 4.3–4.8).

FIG. 13 shows a comparison of the current profiles for the five upset weld tests. Each is seen to have a progressively higher peak, with test 4.8 having a substantially higher peak than the rest. The length of the pulse seems to have no correlation with the initial energy stored in the rotor.

Figure 14:
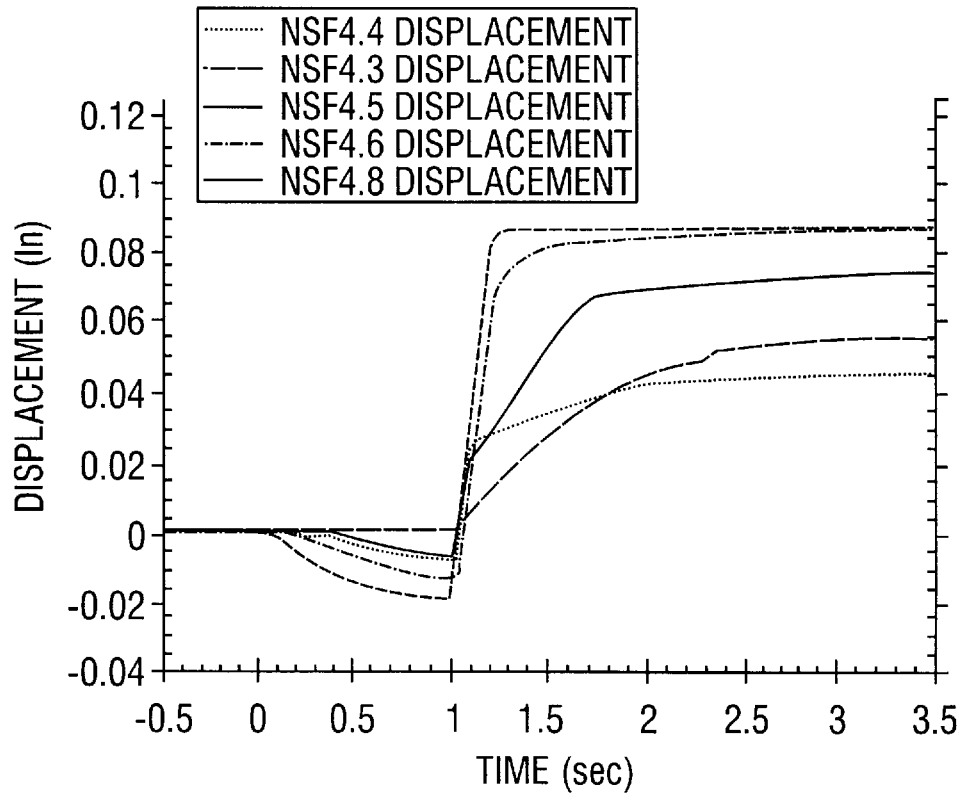
FIG. 14—Comparison of the displacement for the upset weld tests NSF 4.3–4.8.

FIG. 14 shows the displacement curves, where the back-off and upset displacement can be identified for each test. In addition, tests 4.6 and 4.8 both show more back-off displacement prior to upset and a rapid rise to the positive stop after the upset load is delivered. Since the back-off displacement is a direct indication of increased temperature in the workpiece, tests 4.6 and 4.8 show higher temperatures (and thus, more energy deposition). This is verified by the upset displacement, since the forging deformation can take place rapidly only if the forging load is higher than the bulk strength of the workpiece. The upset displacements of test 4.3, 4.4, and 4.5 show that full deformation does not take place below a particular energy deposition. Closer examination of the upset displacement curves for tests 4.3, 4.4, and 4.5 indicate that the workpiece started to deform rapidly, but encountered colder material after a small deformation. When the colder material was encountered, the deformation rate reduced considerably.

An additional point of interest in FIG. 14 is the lack of back-off displacement in test 4.3. The electrical measurements (Table 8) show that test 4.3 had as much energy deposited in the workpiece as test 4.5, yet did not experience any thermal expansion prior to the upset. This is characteristic of non-uniform current (and heating) distribution, where the energy is deposited in smaller localized areas at the interface rather than uniformly around the circumference of the pipe. To achieve the back-off displacement, the increase in load at the interface due to thermal expansion must increase the load measured by the load cell. This forces the servo-valve to back off on the hydraulic cylinder displacement in order to maintain the setpoint load. Thermal expansion at the interface manifests itself as an increase in local pressure and, therefore, the effective increase in load is directly proportional to the total area that is undergoing thermal expansion. If less than the total cross-sectional area of the pipe expands thermally (as happens in the case of non-uniform current distribution), a decrease in the back-off displacement is detected.

This leads to a significant discovery in identifying indicators of weld quality. Because the back-off displacement is measured during the current pulse and is a very reliable indicator of both quantity and uniformity of energy deposition, it can be used as a real-time process control parameter. In addition, the upset displacement can be used conditionally for post-process evaluation of the weld. As long as the servo-valve hydraulic system does not artificially limit the deformation rate, a clear indication of extent of heating at (and around) the interface can be found from the displacement after the upset load is applied.

Figure 15:
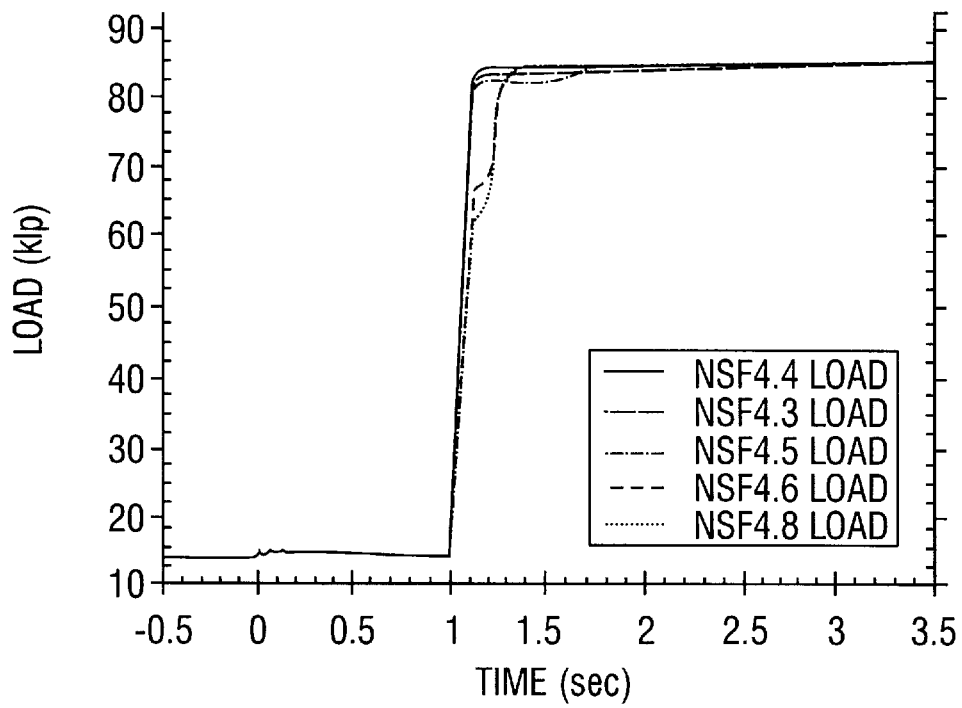
FIG. 15—Comparison of workpiece loads for the upset weld tests NSF 4.3–4.8.

Corresponding closely to the displacement curves, FIG. 15 shows the load on the workpiece for the five tests. A small increase in load can be seen immediately after the current pulse is initiated (at time=0), giving an indication of the response time of the servo-control system. However, after the initial increase, the load is maintained reliably until the upset load is delivered. As the load is increased during upset, tests 4.6 and 4.8 show distinctly different responses from the other tests. The knee in the curves of tests 4.6 and 4.8 before the upset load is achieved indicates that soft material was encountered, rapid deformation was taking place, and the hydraulic cylinder was unable to deliver the prescribed upset load. However, after the positive-stop was reached, the upset load was achieved. Tests 4.3, 4.4, and 4.5 show no knee in the upset load curve because the bulk strength of the workpiece material had not been reduced sufficiently, and the hydraulic cylinder was able to deliver the upset load immediately. Although less quantifiable than the displacement, the shape of the workpiece load curve also gives some indication of the performance of the weld.

IN-PROCESS EVALUATION OF THE WELD QUALITY

Correlation to Destructive Evaluation

The five upset welds (NSF 4.3–4.8) were all tested for tensile strength as a means of quantifying their relative quality. The last two welds of the series of five proved to be as strong as the parent metal and fractured outside the weld line (Table 8, (Haase, 1993)). The goal of the non-destructive evaluation was to determine a set of measurable parameters that distinguish the last two tests (NSF 4.6 and 4.8) from the first three (NSF 4.3, 4.4, and 4.5). The two strong welds have already been shown qualitatively to exhibit different behavior as indicated by the displacement and workpiece load as functions of time (FIGS. 14 AND 15, respectively). The following information utilizes data summarized in the standard synopsis (Table 8) to examine more quantitative means of finding the same distinguishing characteristics.

Figure 16:
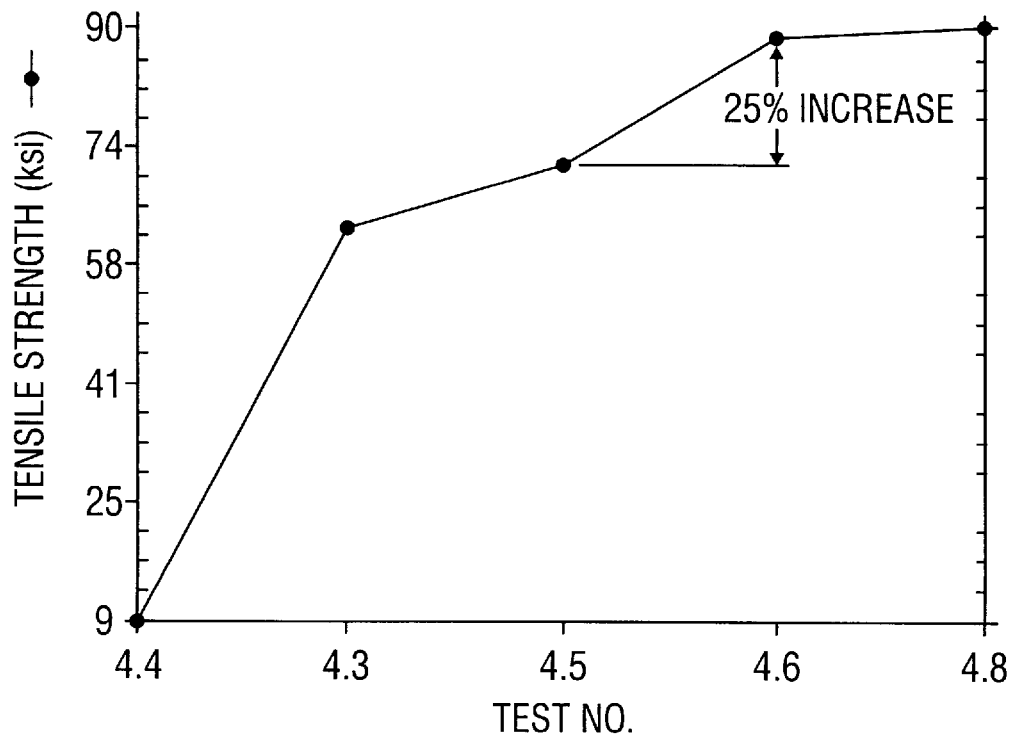
FIG. 16—Tensile testing data for the series of five upset welds (tests 4.3–4.8) with increasing discharge speed as the varying input parameter.

FIG. 16 shows the tensile test data for the series of five upset welds (tests 4.3–4.8). The horizontal axis is arranged in ascending order based on the single input parameter allowed to vary in the test series; the discharge speed (or, the initial energy stored in the rotor). The vertical axis, showing the tensile strength at which the specimen failed, is adjusted so that the lowest value on the axis corresponds to the lowest value in the test series. Similarly, the highest axis value is the highest test value. In the following plots, the parameter being compared to the tensile strength is plotted in a similar manner on the right side axis, with its scale corresponding to the test values of that particular parameter. In this manner, each parameter can be directly compared to the tensile strength to identify the relative sensitivity of weld strength to the parameters being evaluated. In addition, a percentage difference of the measured values is shown between tests 4.5 and 4.6, which bound the division between weak and strong welds. This is done to provide a "threshold" comparison, where the parameter of interest must obtain a threshold value to be indicative of a strong weld. Using both the threshold and direct comparisons, conclusions are made about the validity of the correlation between the tensile strength and data measured in-process.

Figure 17:
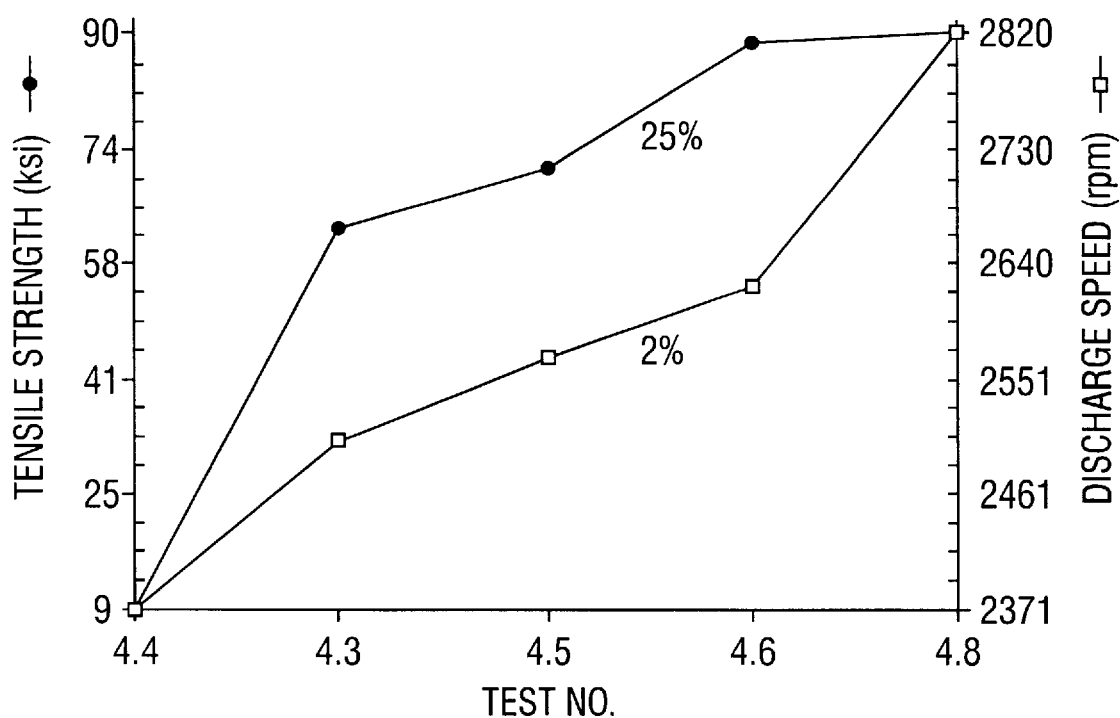
FIG. 17—Discharge speed and tensile strength for the series of five upset welds (tests 4.3–4.8) with increasing discharge speed as the varying input parameter.

FIG. 17 shows a comparison between the tensile strength and discharge speed. In general, the expected result is shown to be that increasing stored energy corresponds to increasing strength of the weld. However, the small difference in discharge speeds that correlates to a difference in weak and strong welds (test 4.5 and 4.6, respectively) indicates the importance of close control of generator speed in homopolar welding.

Figure 18:
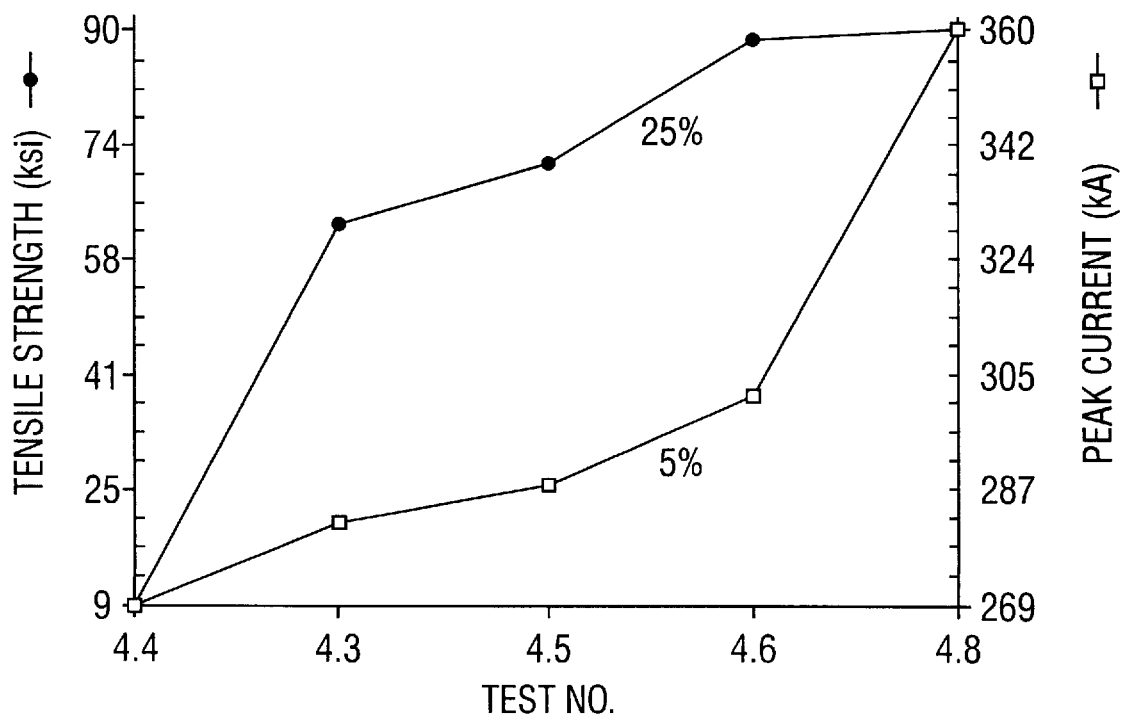
FIG. 18—Peak current and tensile strength for upset welds 4.3 to 4.8 with increasing discharge speed as the varying input parameter.

FIG. 18 compares the tensile strength to the peak current in the discharge circuit. Since the peak current is directly proportional to the discharge speed, a similar correspondence occurs between the tensile strength and peak current as was shown in FIG. 17. Also as with the discharge speed, a relatively small increment in peak current between tests 4.5 and 4.6 produced a noticeable difference in tensile strength. Again this indicates the importance of close control of the discharge speed (and field current, as well). FIG. 18 shows that peak current could be used as an approximate guide to producing a strong weld. Under these particular process conditions, the peak current must be at least ~300 kA (corresponding to ~70 kA/in$^2$ for a 4.21 in$^2$ weld cross section).

Figure 19:
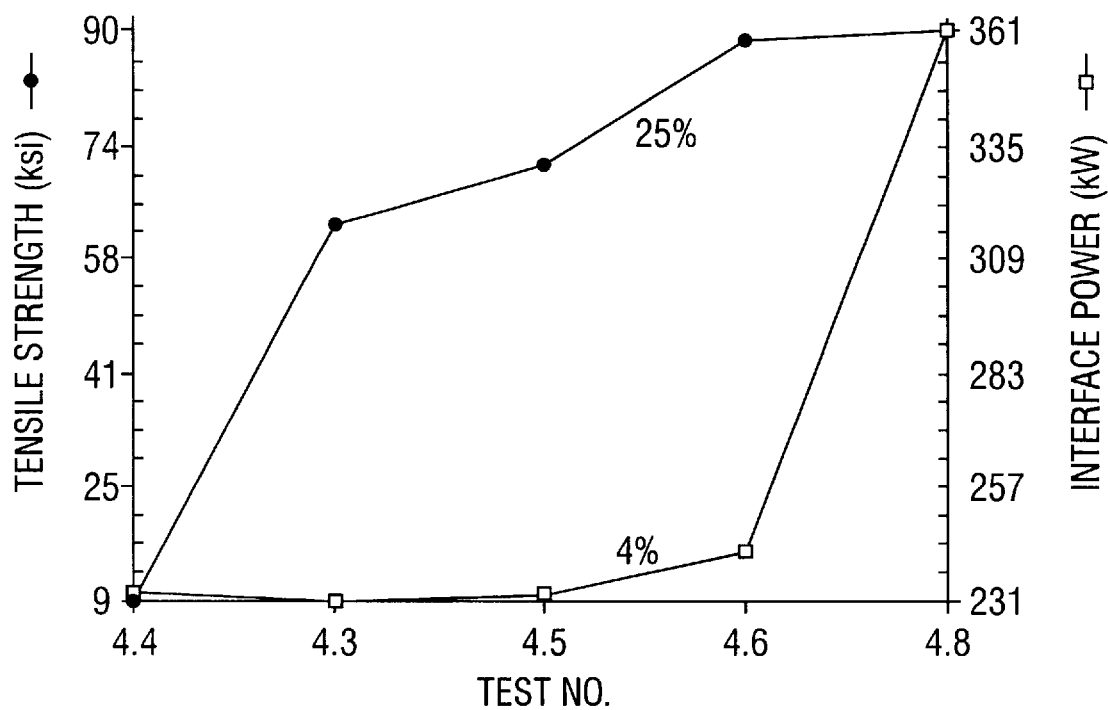
FIG. 19—Interface power and tensile strength for upset welds 4.3 to 4.8 with increasing discharge speed as the varying input parameter.

FIG. 19 compares the tensile strength to the interface power, as derived from the circuit current and interface voltage. As addressed earlier, FIG. 19 shows how test 4.8 overpowered the interface compared to the other tests. Although little correlation is shown between the tensile strength and the interface power, as in the case of the discharge speed and peak current, a threshold value seems to exist that signals the lower edge of the acceptable window for strong welds. For a strong weld to occur in this particular material and weld geometry, the peak interface power should be at least about 240 kW.

Figure 20:
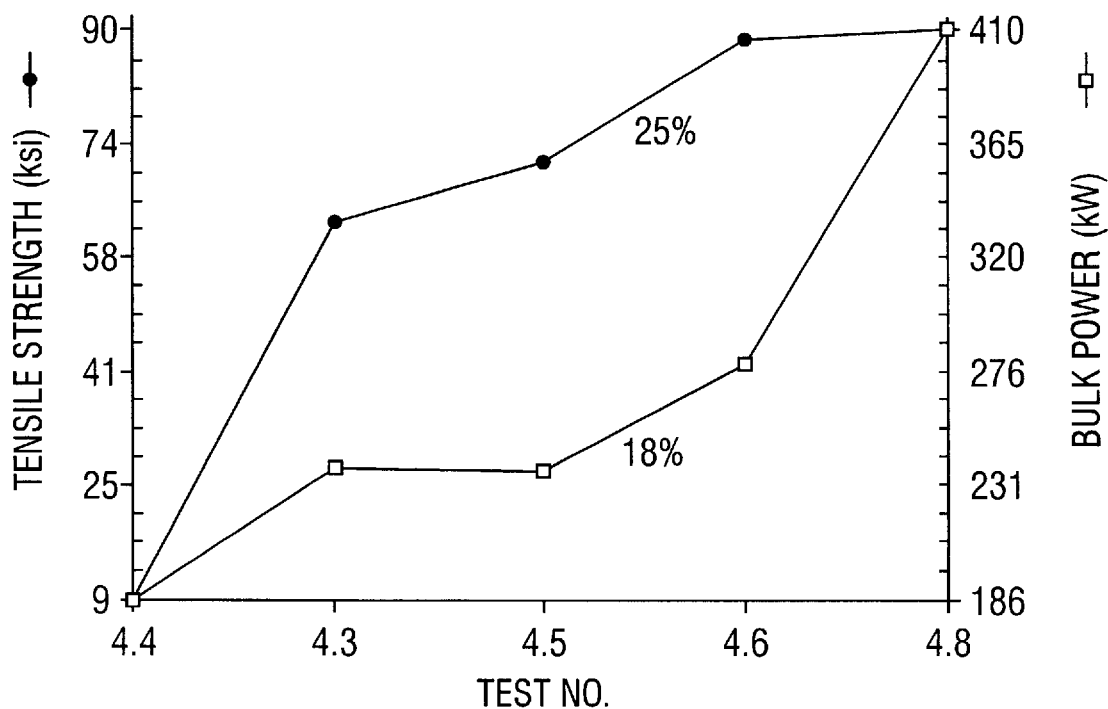
FIG. 20—Bulk power and tensile strength for the series of five upset welds (tests 4.3–4.8) with increasing discharge speed as the varying input parameter.

The bulk power (FIG. 20) shows a stronger threshold correlation to the tensile strength. As evidenced by the percentage increase between tests 4.5 and 4.6, there is significantly more sensitivity in the response of the bulk power curve.

Figure 21:
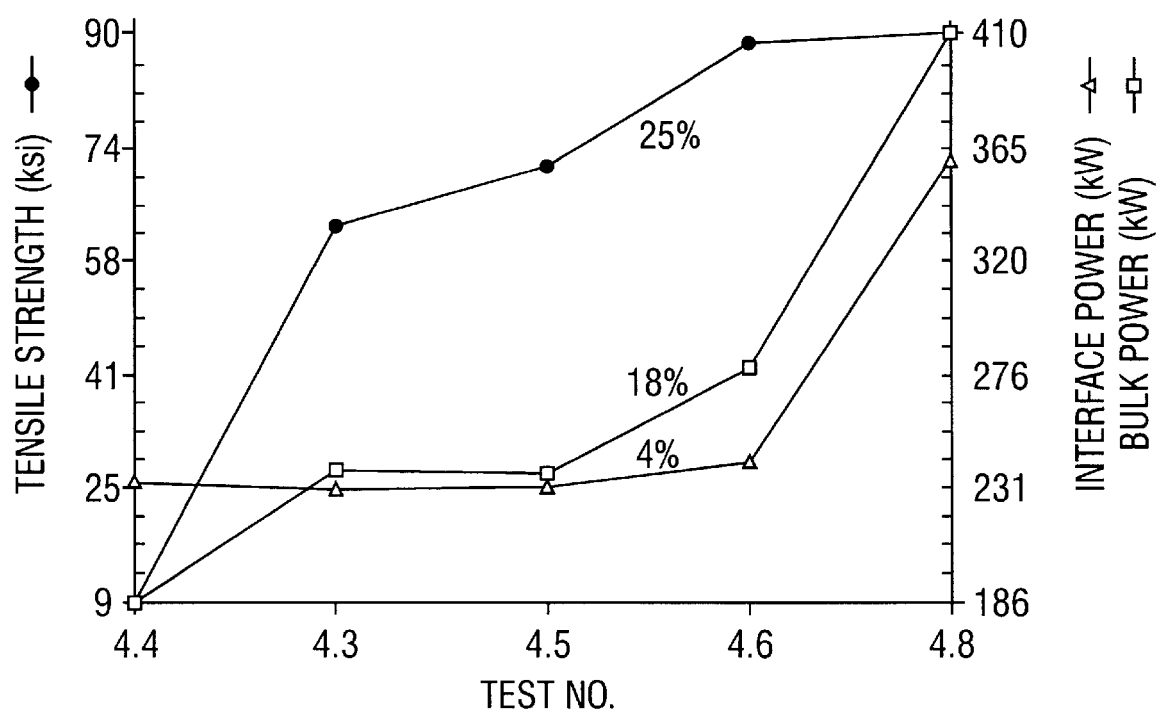
FIG. 21—Interface and bulk power and tensile strength for the series of five upset welds (tests 4.3–4.8) with increasing discharge speed as the varying input parameter.

An interesting result is produced by putting both the interface and bulk powers on the same plot with the tensile strength (FIG. 21). The first test (4.4) shows the interface power greater than the bulk, and resulted in a very weak weld. The next two tests (4.3 and 4.5) show that the interface and bulk power are relatively balanced and produced stronger, but still weak welds. The last two tests (4.6 and 4.8) show the bulk power to be increasingly larger than the interface power and resulted in strong welds. This indicates that under a given current pulse condition the interface power appears to reach a saturation limit where any additional increase in power must be deposited into the pipe bulk material alone. This saturation limit of the interface could possibly be related to what Holm described as the melting voltage limit. The balance between the interface and bulk power, then, could possibly result in an early indication of weld strength.

Integrating the interface and bulk powers, the respective energies deposited are shown in FIGS. 22(A–D). FIG. 22(A) compares the interface energy to the tensile strength and shows some similarity between the curves, but still less than adequate response of the interface energy to changes in the tensile strength. The bulk energy curve in FIG. 22(B) shows very good response to the tensile strength, even to the point of reaching a deposition limit at the same time the tensile strength reaches its material limit. In addition, the bulk energy shows the first strong threshold correlation, where the percentage increase at test 4.6 is larger than that for the tensile strength.

Figure 22A:
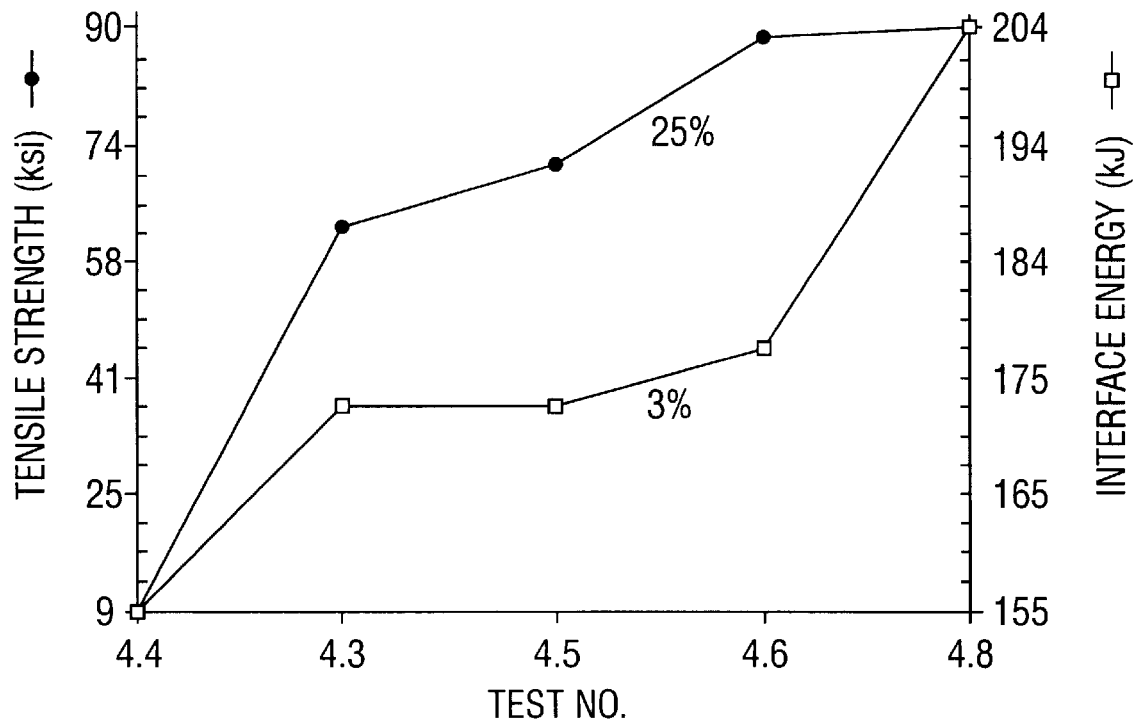
FIG. 22(A)—Interface energy and tensile strength.
Figure 22B:
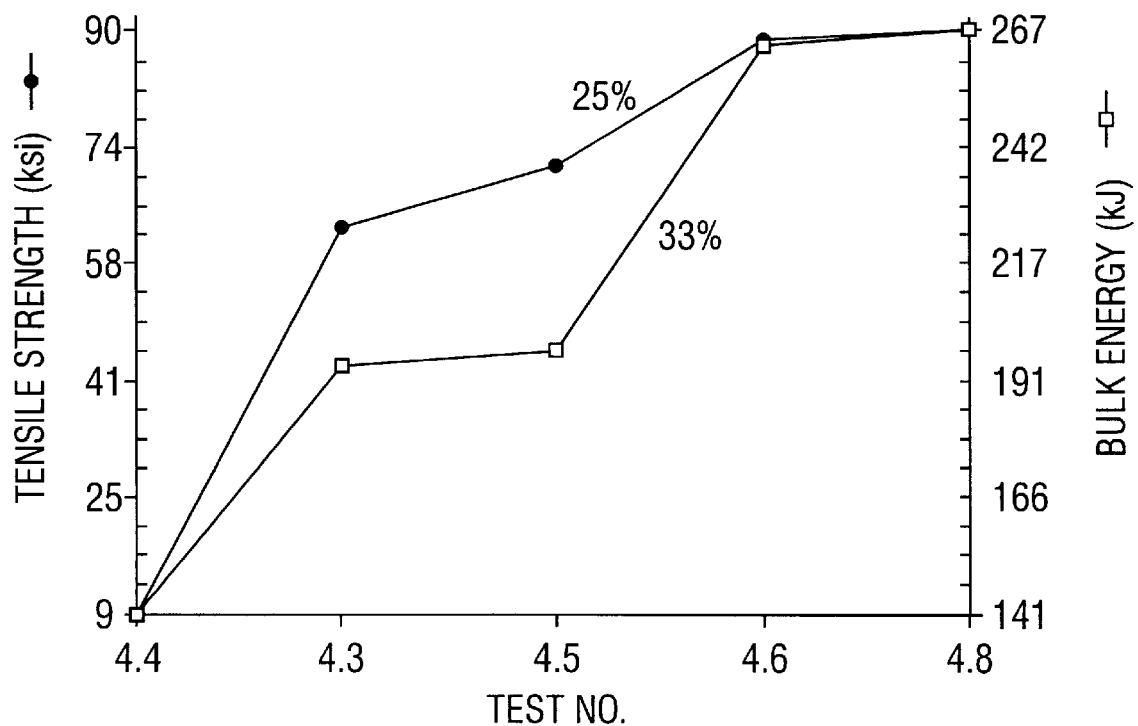
FIG. 22(B)—bulk energy and tensile strength.
Figure 22C:
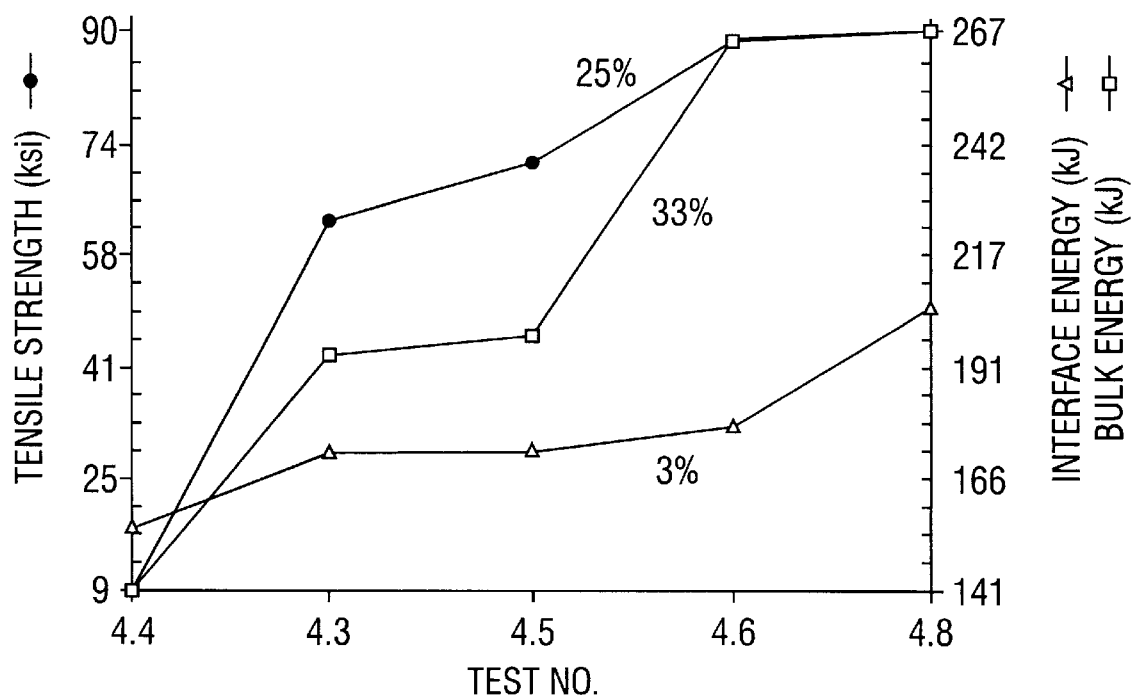
FIG. 22(C)—interface and bulk energy and tensile strength.

Similar to FIG. 21, FIG. 22(C) shows the interface and bulk energies separately but on the same plot as the tensile strength. Following the same scenario as the power, the interface energy is higher than the bulk energy in test 4.4 and results in a weak weld. Then, the interface and bulk values in tests 4.3 and 4.5 are again relatively equal and follow the same trend. However, the balance of energies is significantly different in tests 4.6 and 4.8. The bulk energy increases dramatically between tests 4.5 and 4.6, while the interface energy remains relatively constant. Again, as with the balance between interface and bulk power, the interface appears to reach a saturation limit where any additional energy must be deposited into the bulk of the pipe material. Note that this results in a significant increase in workpiece heating efficiency, where a very small (2%) increase in discharge speed (or a 4% increase in stored energy) produces a large (33%) increase in bulk heating.

Converse to the difference between tests 4.5 and 4.5, a comparison of tests 4.6 and 4.8 shows that the interface energy increases when the bulk energy remain stable. The higher and sharper peak interface voltage in test 4.8 appears to be seen directly as a large increase in interface energy. Also, as with the interface and bulk powers, the balance between the energies results in a good indication of weld strength.

Figure 22D:
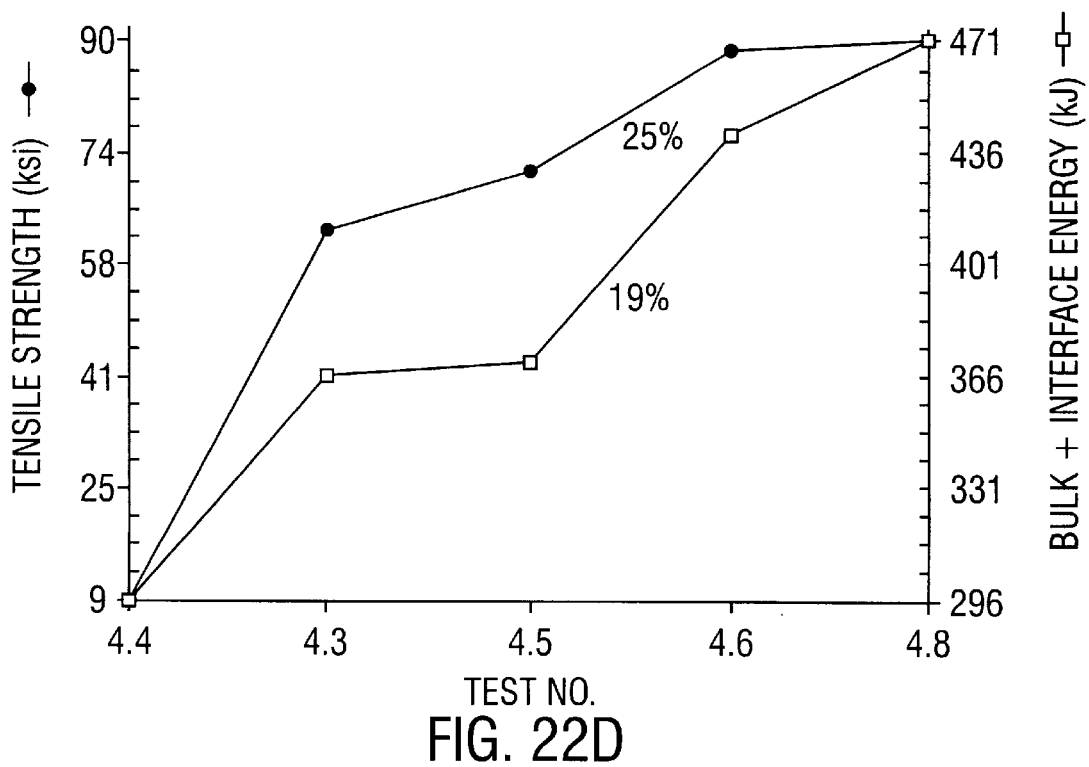
FIG. 22(D)—sum of interface and bulk energy and tensile strength; all for the series of five upset welds (tests 4.3–4.8) with increasing discharge speed as the varying input parameter.

FIG. 22(D) shows again the easily measured combination of interface and bulk energies. Again, although the combination of bulk and interface energy is easier to measure, the weld dynamics are best observed by separating the two.

Figure 23:
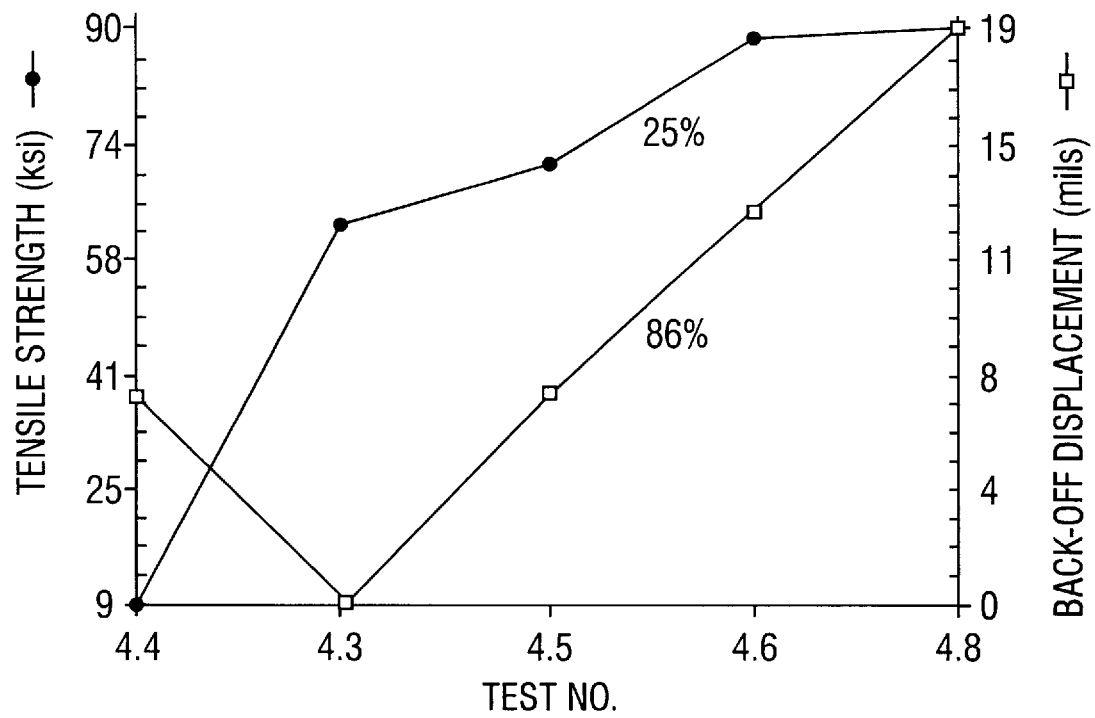
FIG. 23—Back off displacement and tensile strength for the series of five upset welds (tests 4.3–4.8) with increasing discharge speed as the varying input parameter.
Figure 24:
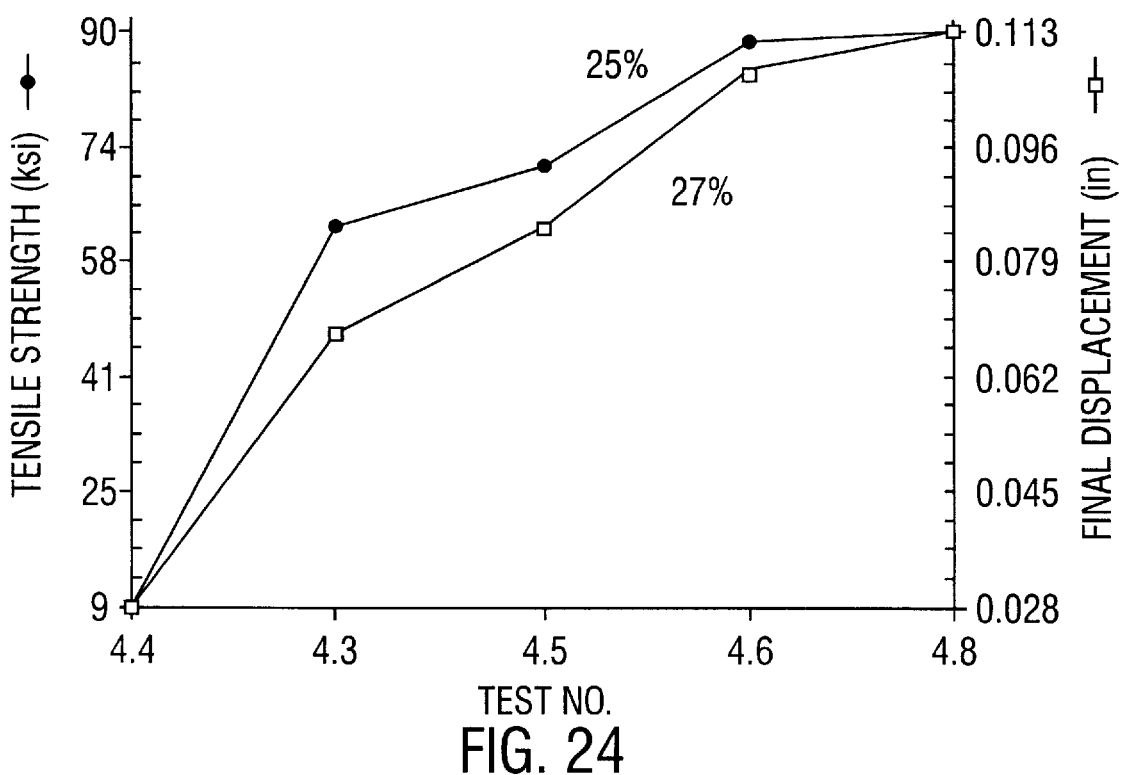
FIG. 24—Final displacement and tensile strength for the series of five upset welds (tests 4.3–4.8) with increasing discharge speed as the varying input parameter.
Figure 25A:
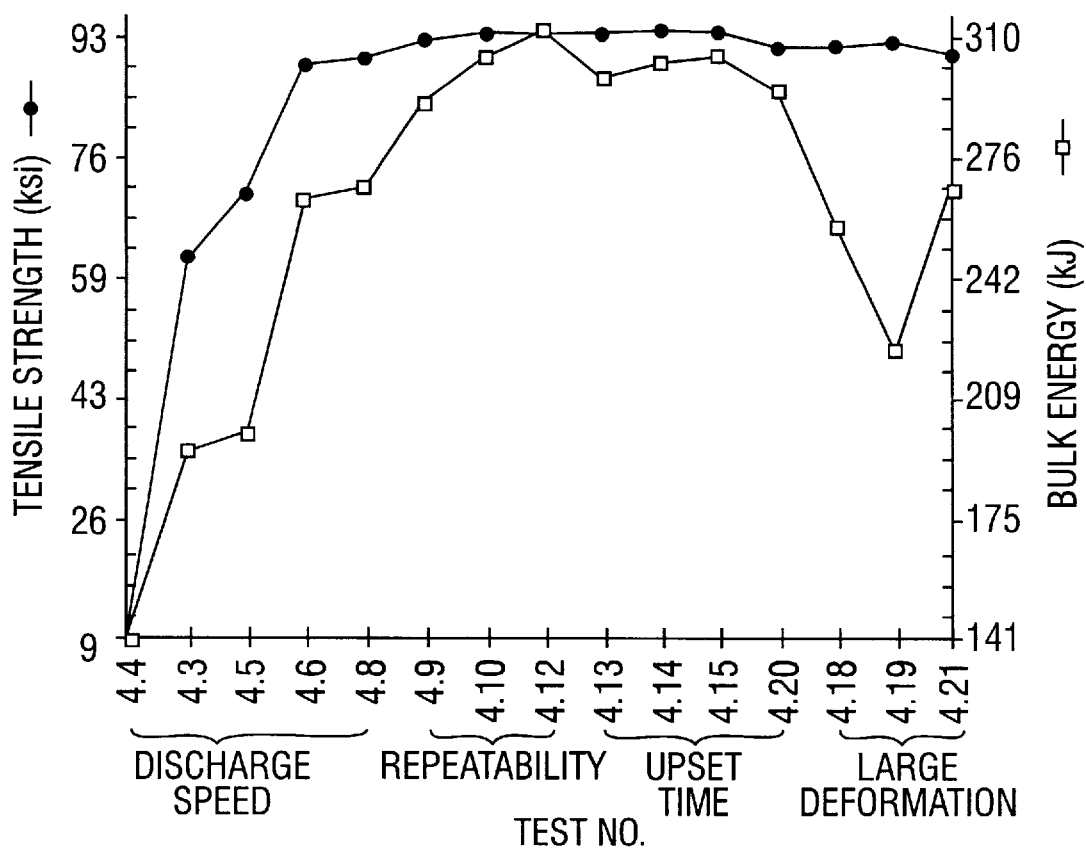
FIG. 25(A)—Bulk energy and tensile strength.
Figure 25B:
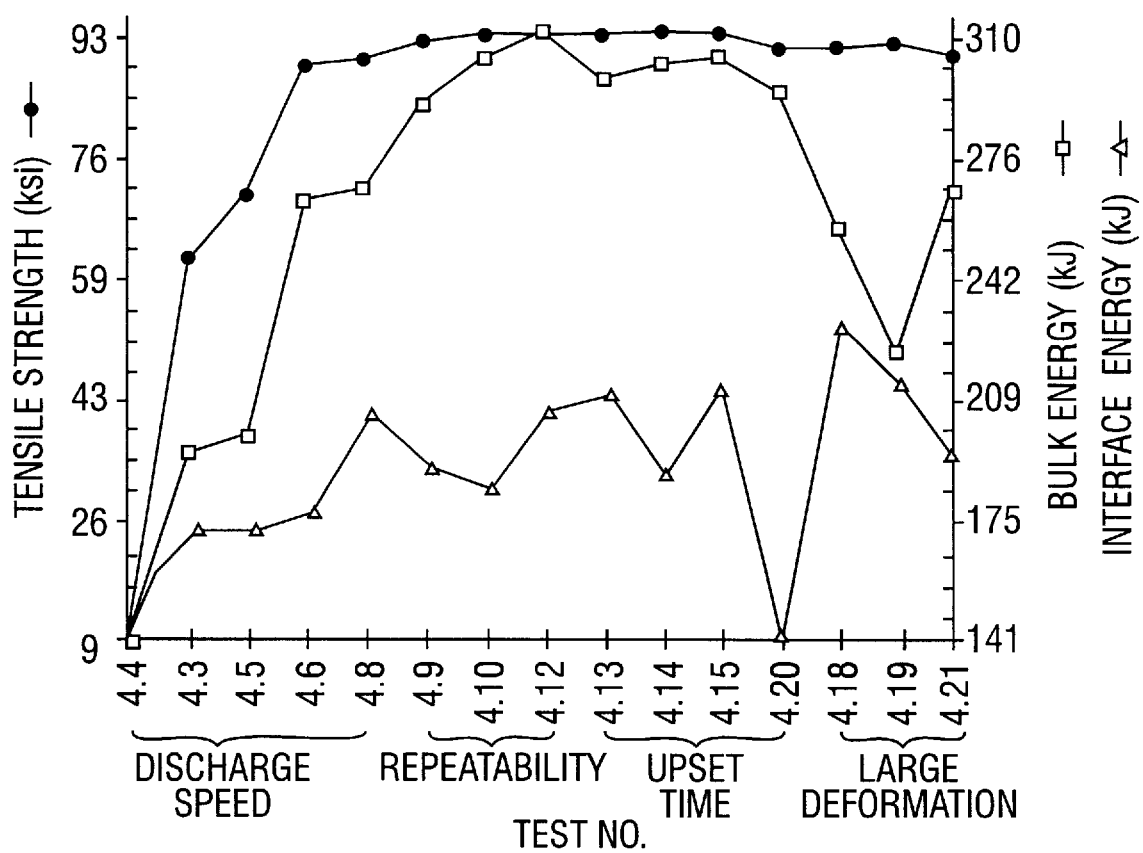
FIG. 25(B)—Interface and bulk energy and tensile strength.
Figure 25C:
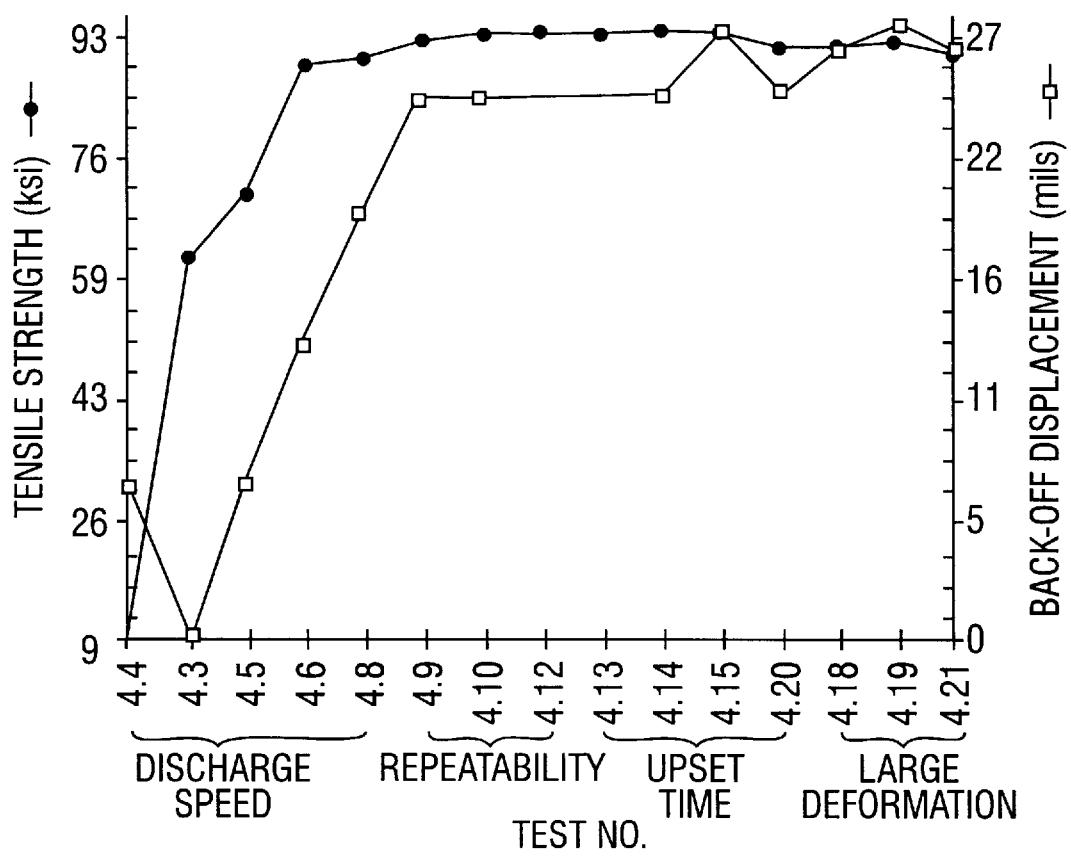
FIG. 25(C)—tensile strength and back off displacement.
Figure 25D:
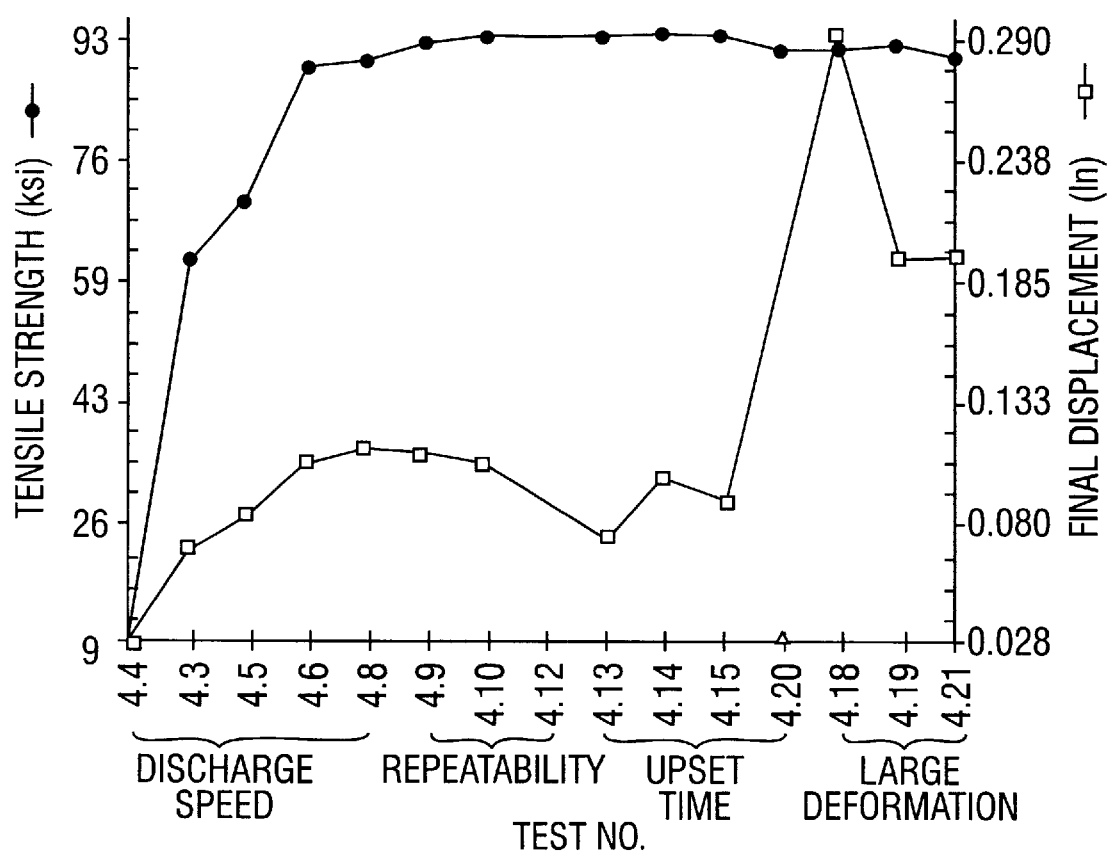
FIG. 25(D)—tensile strength and final displacement; all for the four series of upset welds.

As shown earlier in FIG. 14, the displacement curve produces a qualitative correlation to the tensile strength of the weld. FIGS. 23 and 24 quantify this relationship by separating the back-off displacement due to thermal expansion and the final displacement due to forging deformation. FIG. 23 shows that the back-off displacement produces the strongest threshold correlation to tensile strength. Since the percentage change between tests 4.6 and 4.8 is more than three times that found with the tensile strength, the back-off displacement can be considered a strong threshold indicator of weld strength. Note, however, that the back-off displacement does not produce a strong direct correlation to the tensile strength. The back-off displacement intuitively should be a direct indication of the energy deposited in the workpiece, but examination of FIG. 22(D) shows this not to be case for the two lower energy tests. There are two probable causes for the lack of direct correlation; non-uniform current distribution and axial thermal gradients away from the weld zone. The lack of back-off displacement in test 4.3 is characteristic of non-uniform current (and heating) distribution. Yet, as shown in FIG. 22(D), test 4.3 had similar energy deposition to test 4.5 with significantly less back-off displacement. Therefore, the back-off displacement can be recognized as more of a "global" indicator of weld quality, taking into account both the energy deposition and the current uniformity.

As previously set forth, the slope of the displacement curve during forging is indicative of weld quality. The slope of the displacement curve is sufficient when the weld zone material is soft enough from heating that it does not appreciably effect movement of the pipes during forging displacement. As seen in tests 4.6 and 4.8, the hydraulic servo-valve circuit was the only restriction to the movement of the pipes during forging displacement (measured at approximately 0.3 in./sec. in test 4.6).

The existence of variations in axial thermal gradients between tests is another cause of the back-off displacement not producing a direct correlation to the tensile strength. As shown in FIG. 22(C), the balance between the interface and bulk energy deposition is dependent upon the total energy delivered to the workpiece (i.e. the initial energy stored in the rotor). The balance between the interface and bulk energies also produces a difference in the back-off displacement, which of necessity sums up the total displacement due to all energy deposition. Because the interface energy deposition is more concentrated, it results in more heating, and more thermal expansion. Alternatively, the bulk energy deposition is more distributed, resulting in less thermal expansion. Therefore, the balance of energy deposition also affects the back-off displacement as a direct correlation to tensile strength. However, there is no doubt about the validity of the back-off displacement as a threshold indicator.

The final displacement (FIG. 24) produces a very strong direct correlation to the tensile strength through the entire upset weld test series. Also, as in the case of the bulk energy, the final displacement reaches a limit at the same time as the tensile strength. Taken together, the back-off and final displacement values result in good in-process weld monitoring diagnostics.

In summary, it can be concluded that the parameters measured and presented in this comparison fall into two categories; threshold correlation and direct correlation parameters. A threshold correlation is a parameter whose value must obtain some minimum limit for a strong weld to be produced, but does not necessarily follow the same trend as the tensile strength through the entire upset weld test series. A direct correlation is one that follows closely the values of tensile strength through the entire test series. The separation of parameters is shown in Table 9.

TABLE 9

A comparison of the in-process, weld quality evaluation parameters, separating each into either a threshold or direct correlation to the tensile strength of the five upset weld tests (NSF 4.3–4.8).

| Parameter | *Threshold Correlation | Direct Correlation |
|---|---|---|
| Discharge Speed | 2% | |
| Peak current | 5% | |
| Interface power | 4% | |
| Bulk power | 18% | |
| IntP/BulkP relative values | — | some |
| Int + Bulk power | 11% | |
| Interface energy | 3% | |
| Bulk energy | 33% (strong) | strong |
| IntE/BulkE relative values | — | strong |
| Int + Bulk energy | 19% | |
| Back-off displacement | 86% (strong) | |
| Final displacement | 27% (strong) | strong |

*= This indicates the percentage difference in the measured values between tests 4.5 and 4.6. The weld tensile strength experienced a 25% increase between tests 4.5 and 4.6, and a parameter is not considered a strong threshold indicator unless it exhibits at least as much increase between the two tests.

Extension of In-Process Evaluation Criteria

The purpose of this section is to compare the weld strength indicators determined in the previous section to the tensile strength of a new set of upset weld tests. This provides the beginning of the data base required for validation on in-process evaluation of homopolar welding. The four parameters that are compared to the tensile strength in this section are the bulk energy, the relative values of the bulk and interface energies, the back-off displacement, and the final displacement. FIGS. 25(A–D) show the quantitative comparison of the output parameters. The left and right scales indicate where the lower and upper boundaries are the lowest and highest values in the series, respectively.

The previous comparison of welding process parameters to weld tensile strength showed that a strong threshold correlation could be made using the bulk energy, and the back-off and final displacements. In addition, strong direct correlations could be made using the final displacement, and interface and bulk energies. It was also noted that the balance between the interface and bulk energies produced a strong correlation to the weld strength, as well as affecting the direct correlation of the back-off displacement. To further examine the balance of the interface and bulk energies and to more closely quantify the location of energy deposition, voltage gradient tests were conducted using continuous pipe (test SP 10.1) and constant load (test NSF 4.21) setups. The voltage gradient tests consisted of attaching (by spot weld) a ribbon cable to the surface of the pipes between the electrodes, straddling the interface. This axial voltage probe array had the effect of separating the bulk and interface lumped elements into several smaller lumped elements. By characterizing each of the smaller lumped elements by its individual voltage drop, a more refined examination could be made of the energy deposition in the workpiece.

Figure 26:
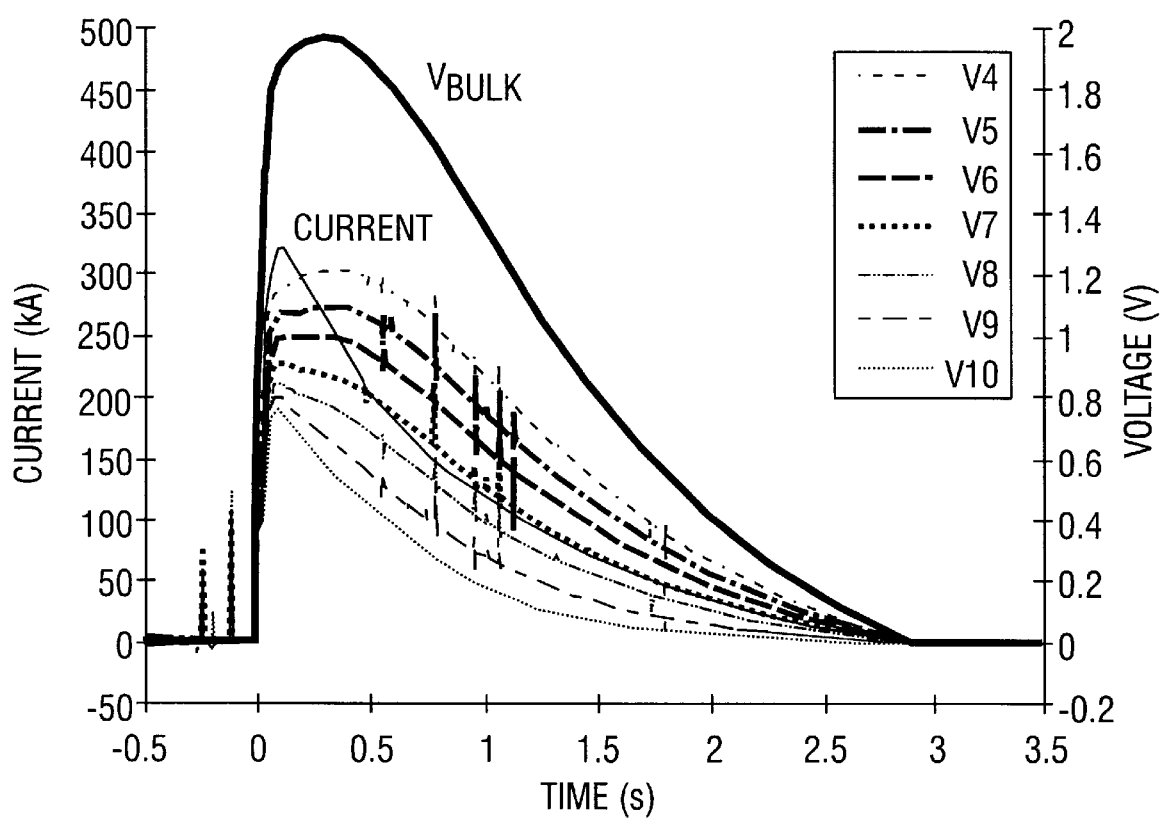
FIG. 26—Raw voltage output from the NSF 4.21 constant load voltage gradient test.
Figure 27:
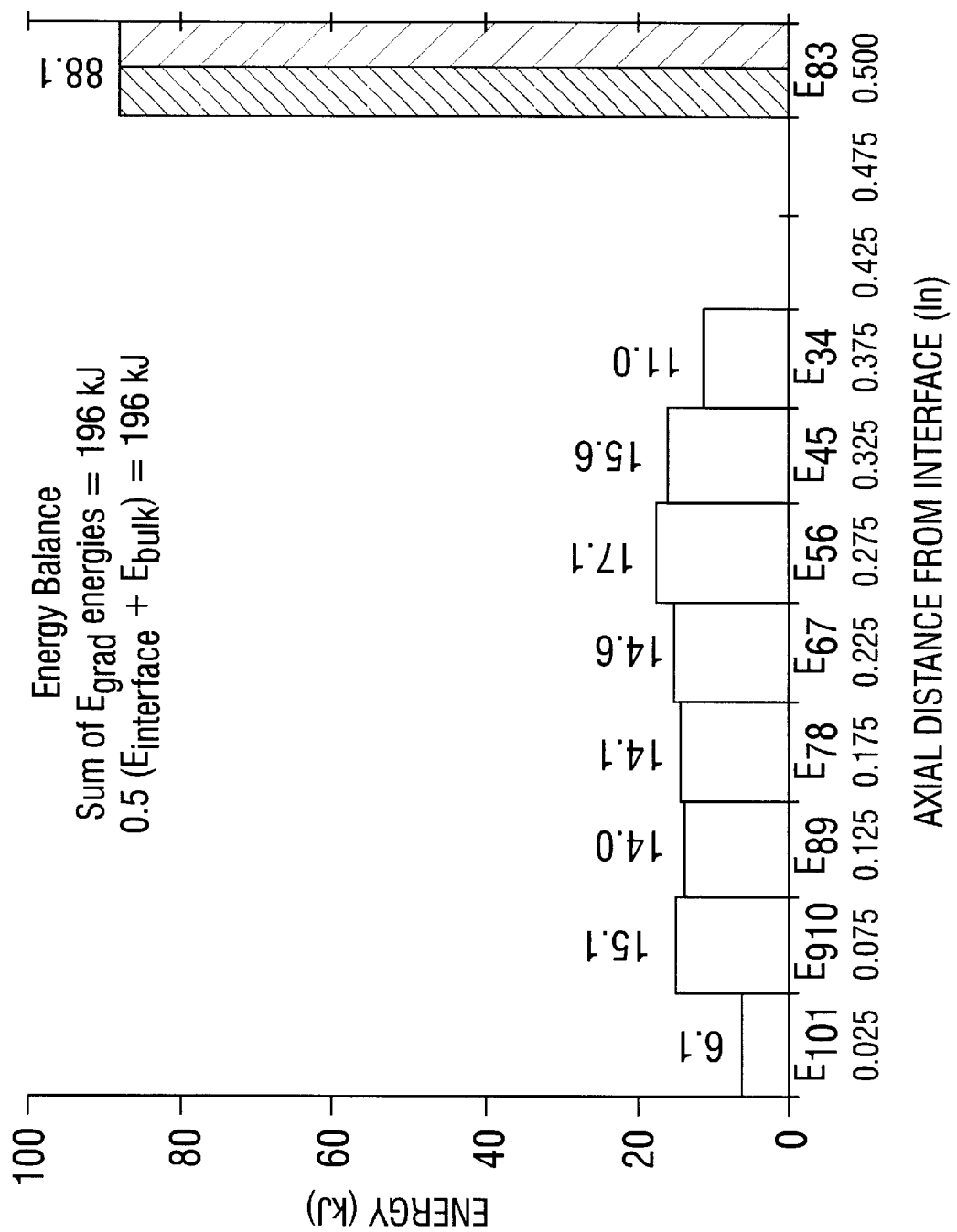
FIG. 27—Derived energy gradient for the SP 10.1 continuous pipe test.
Figure 28:
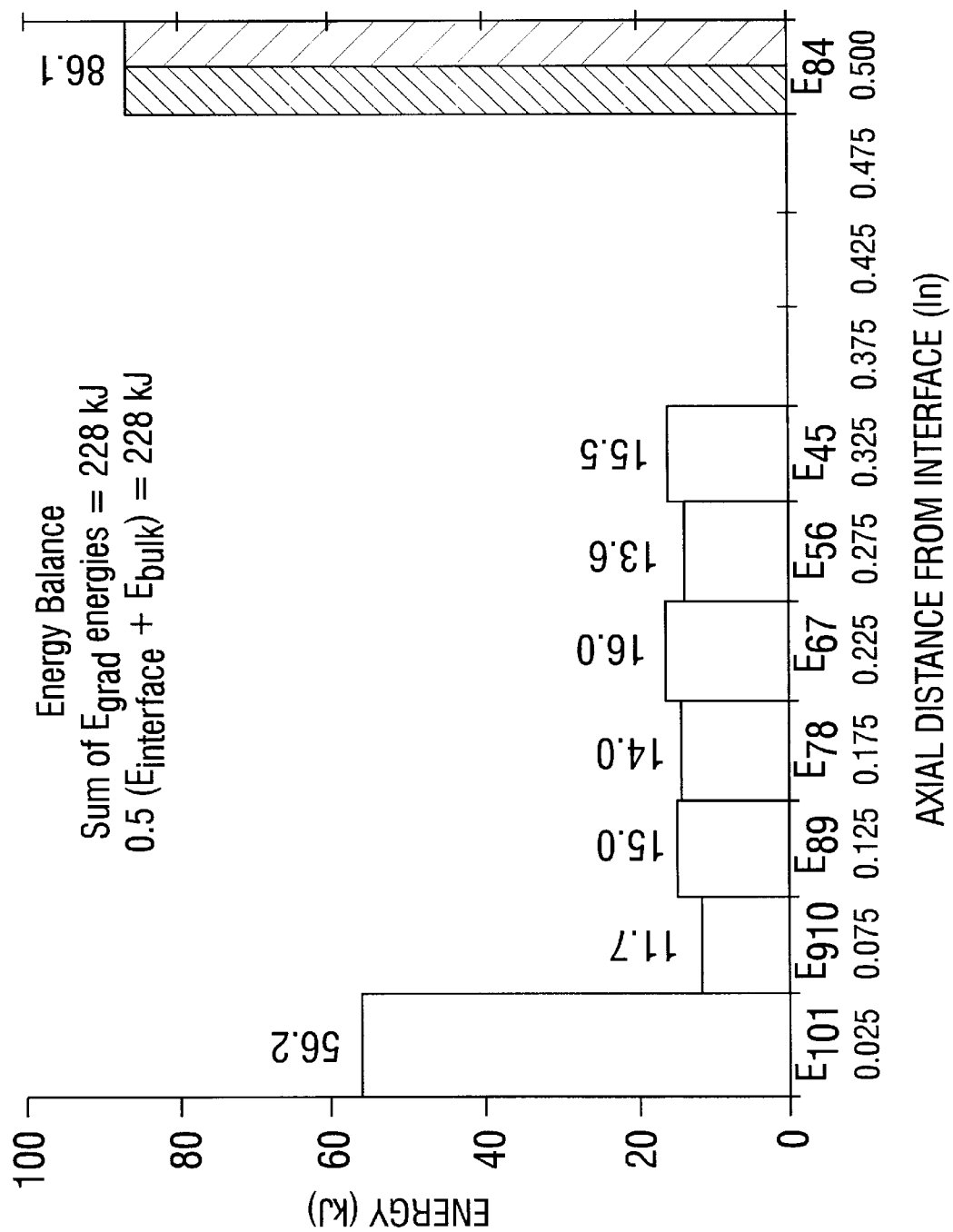
FIG. 28—Derived energy gradient for the NSF 4.21 constant load test.

To calculate the energy deposited at each discrete interval between the voltage probes, the voltage measurements were separated as shown in Table 10. Using the measured current and taking only half the voltage drop (to calculate the energy deposited into a single pipe), the axial energy gradients were determined for both the continuous pipe and constant load tests (FIG. 26 and FIG. 27). Shown in the energy gradient are the individual energies, as well as the energy deposited between the bulk voltage probe and the furthest voltage gradient probe outboard of the interface ($V_3$ for test 10.1, and $V_4$ for test 4.21). Also shown in the figures is the energy balance comparing the sum of the interface and bulk energies (as measured by the standard voltage probes) and the sum of the energies calculated using the voltage gradient measurements. Since these energies balance in both test cases, the voltage gradient measurements are shown to be valid.

TABLE 10

Separation of the raw voltage gradient measurements and the energies calculated from them. The energies are calculated to be the energy deposited in one pipe in the increment between individual voltage probes.

| Derived Voltage | Calculated from | Derived Energy |
|---|---|---|
| $V_{101}$ | $0.5\ (V_{10})$ | $E_{101}$ |
| $V_{910}$ | $0.5\ (V_9 - V_{10})$ | $E_{910}$ |
| $V_{89}$ | $0.5\ (V_8 - V_9)$ | $E_{89}$ |
| $V_{78}$ | $0.5\ (V_7 - V_8)$ | $E_{78}$ |
| $V_{67}$ | $0.5\ (V_6 - V_7)$ | $E_{67}$ |
| $V_{56}$ | $0.5\ (V_5 - V_6)$ | $E_{56}$ |
| $V_{45}$ | $0.5\ (V_4 - V_5)$ | $E_{45}$ |
| $V_{34}$ | $0.5\ (V_3 - V_4)$ | $E_{34}$ |
| $V_{B3}$ | $0.5\ (V_{bulk} - V_3)$ | $E_{B3}$ |

Determination of Weld Parameters

A determination of proper weld parameters may be separated into three steps: continuous pipe tests, constant load tests, and upset weld tests.

The continuous pipe tests serve three purposes in characterizing a homopolar weld system:

1. understanding input parameter tradeoffs between discharge speed and field current
2. quantifying energy distribution in the system
3. determining electrical lumped element values for model development.

With a continuous pipe (no interface) as the work-piece load in the discharge circuit, the effects of varying the field current and discharge speed on current pulse length, peak current in the workpiece, and the time of peak for the current are determined. In general, increasing the field current produces a higher current and shorter pulse length by increasing the power output (removing energy from the generator more quickly). Increasing the discharge speed results in higher current and longer pulse lengths by storing more energy in the generator. For the weld program described here, the field current was maintained at an empirically determined constant value throughout all tests. The field current value (300 A) was found to produce a sufficiently slow current pulse (approximately 100 ms to peak and 3 s total pulse length) to ensure uniform current distribution at the interface. As a rule-of-thumb for peak current values, the steel welds in this program required a minimum of 70 kA/in² to produce a strong weld.

Quantifying and balancing the energy distribution in the system is a useful tool for determining the accuracy of the data acquisition system. If errors are found in the energy balance during the continuous pipe tests, it is easier to refine the data acquisition and analysis before an interface is introduced into the discharge circuit. For the weld program described here, the measurements were considered correct if the energy unaccounted for in the energy balance was less than 10% of that originally stored in the rotor.

To determine the lumped element values in the discharge circuit, each lumped element resistance and inductance can be quantified by using the closed-form solution to the RLC series circuit and the voltage measured across the individual circuit impedances. These values form the basis for developing a state-variable model to accurately predict the system performance for varying input conditions.

The constant load tests are used for three purposes:

1. refinement of the input parameters
2. determination of work-piece cooldown rate
3. determination of upset timing.

Refinement of the input parameters is typically an iterative process for each new workpiece material and geometry; however, some guidelines have been identified in this research. Use of the back-off displacement from thermal expansion in coordination with the voltage gradient tests measures whether sufficient energy is deposited at the interface. For the particular material, geometry, surface finish, and initial load used in the welds presented here, the minimum back-off displacement was found to be 13 mils. It is important to note, however, that this back-off displacement is also highly dependent upon the electrode distance. With a larger electrode distance, more bulk material is heated and the value measured for the back-off displacement changes. Therefore, the back-off displacement required for strong welds must also be characterized for each new weld geometry.

The voltage gradient test may be used to verify sufficient energy deposition at the interface. It was found in this research that within 0.025 in. of the interface of a strong weld, the energy density for X-52 steel pipe is 535 kJ/in³. If the proper current density is being produced in the discharge circuit, energy concentration at the interface may be controlled by varying the initial load of the workpiece. The initial load for the tests presented here was kept at a constant value of 13.5 kip because earlier tests had shown that this value produced sufficient energy concentration while avoiding spitting at the interface.

As defined herein, a quality weld is one that exhibits at least as high a tensile strength as the parent metal and fails outside of the weld line in a tensile test. It is recognized that refinement of the input parameters to produce a tough joint, with a weld that has an industry acceptable impact toughness, is a feature of the invention.

TABLE 11

Summary of the generalized testing methodology.
$J_w$ = current density in the workpiece (KA/in²)
$D_{bo}$ = back-off displacement of the workpiece (mils)
$E_w$ = energy density within 0.025 in. of the interface (kJ/in³)

| Test | Purpose | Generalized Milestone* |
|---|---|---|
| continuous pipe tests | input parameter tradeoffs energy distribution lumped element identification | $J_w \geq 70$ kA/in² |
| constant load tests | refining input parameters workpiece cooldown rate upset timing | $D_{bo} > 13$ mils $E_w > 535$ kJ/in³ |

TABLE 11-continued

Summary of the generalized testing methodology.
$J_w$ = current density in the workpiece (KA/in$^2$)
$D_{bo}$ = back-off displacement of the workpiece (mils)
$E_w$ = energy density within 0.025 in. of the interface (kJ/in$^3$)

| Test | Purpose | Generalized Milestone* |
| --- | --- | --- |
| upset weld tests | further refinement of input parameters to match desired weld quality | depends upon input parameters |

The upset weld tests set forth as examples herein may be used to correlate weld tensile strength to a number of output parameters measured during the welding process. Although several parameters yielded a correlation to tensile strength, the back-off displacement due to thermal expansion at the interface, the final displacement due to forging of the workpieces, and the electrical energy deposited into the bulk material of the pipe around the interface produced strong indicators of whether a strong weld had been made. Since both the final displacement and the bulk energy deposition are evaluated after the weld has been made, they are best suited for post-process nondestructive evaluation (NDE) of weld strength. However, since the back-off displacement is measured prior to upset, it is well suited for real-time control of weld strength. As the requirements for weld quality are refined (e.g. toughness, upset lip contour, etc.), the in-process, NDE criteria should also be refined.

All of the methods disclosed and claimed herein may be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. All substitutes and modifications apparent to those skilled in the art are deemed to be within the spirit, scope and concept of the invention as defined by the appended claims.

What is claimed is:

1. A method for real-time weld-quality control in a weld-quality control system for homopolar-pulsed welding, comprising:
   characterizing a homopolar welding system;
   conducting controlled weld tests to determine at least one in-process parameter that correlates to a satisfactory weld-quality of a weld;
   identifying at least one of said at least one in-process parameter that may be used as a real-time weld-quality control parameter; and
   utilizing said at least one real-time weld-quality control parameter as an in-process measured parameter to control the weld-quality during a homopolar pulsed welding process.

2. The method according to claim 1, wherein the in-process weld quality parameters include discharge speed, peak current, interface power, bulk power, interface power/bulk power relative values, interface power plus bulk power, interface energy, bulk energy, interface energy/bulk energy relative values, interface energy plus bulk energy, back-off displacement, and final displacement.

3. The method according to claim 2, wherein the in-process parameter is back-off displacement.

4. A method for real-time weld-quality control in a weld-quality control system for homopolar pulsed welding, comprising:
   determining a desired level of back-off displacement that correlates to a desired weld-quality;
   measuring a back-off displacement during a homopolar pulsed welding process; and
   feeding said measured back-off displacement to a control system to control energy to work-pieces being welded so that said back-off displacement is substantially equal to said desired level of back-off displacement.

5. A method for post-process weld-quality verification for homopolar pulsed welding, comprising:
   characterizing a homopolar welding system;
   conducting controlled weld tests to determine at least one in-process parameter that correlates to a resulting weld-quality of a weld;
   identifying at least one of said at least one in-process parameter that may be used as a post-process weld-quality verification parameter; and
   utilizing said at least one post-process weld-quality verification parameter as an in-process measured parameter to verify the weld-quality after a homopolar pulsed welding process.

6. The method according to claim 5, wherein the in-process weld quality parameters include discharge speed, peak current, interface power, bulk power, interface power/bulk power relative values, interface power plus bulk power, interface energy, bulk energy, interface energy/bulk energy relative values, interface energy plus bulk energy, back-off displacement, and final displacement.

7. The method according to claim 5, wherein the post process weld quality verification parameters are bulk energy, forging displacement, and slope of the displacement curve.

8. A method for post-process weld-quality verification for homopolar pulsed welding, comprising:
   determining a desired level of bulk energy deposition and a desired level of final forging displacement that correlates to a desired weld-quality;
   measuring a bulk energy deposition and a final forging displacement after a homopolar pulsed welding process; and
   verifying weld-quality by comparing said measured bulk energy deposition and said measured final forging displacement to said desired level of bulk energy deposition and a desired level of final forging displacement.

9. A method for real-time weld-quality control in a given homopolar pulsed welding system for welding two lengths of conduit end-to-end, comprising:
   characterizing the homopolar welding system;
   conducting controlled weld tests of the characterized welding system to determine at least one in-process parameter that correlates to a satisfactory weld-quality of a weld;
   monitoring the at least one in-process parameter while homopolar pulse welding the two lengths of pipe; and
   maintaining the monitored parameter at a value and for a time sufficient to provide a satisfactory weld-quality.

10. The method according to claim 9, wherein the in-process weld quality parameters include discharge speed, peak current, interface power, bulk power, interface power/bulk power relative values, interface power plus bulk power, interface energy, bulk energy, interface energy/bulk energy relative values, interface energy plus bulk energy, back-off displacement, and final displacement.

11. The method according to claim 10, wherein the in-process weld quality parameter is back-off displacement.

12. The method according to claim 10, in which a forging load is applied to the conduits when said sufficient displacement has occurred.

13. A method for welding two conduits end-to-end, comprising:

abutting the ends of the two conduits to define a weld interface;

transmitting homopolar pulse welding energy to the conduits;

monitoring the amount of back-off displacement at the interface during such transmission; and controlling the amount of welding energy transmitted to the conduits in response to the monitored amount of back-off displacement to obtain sufficient back-off displacement to effect a weld at said interface.

* * * * *